United States Patent
Gill et al.

(10) Patent No.: US 12,297,923 B2
(45) Date of Patent: May 13, 2025

(54) MULTI-PORT THERMAL MODULE

(71) Applicant: Vitesco Technologies USA, LLC, Auburn Hills, MI (US)

(72) Inventors: Ravinder Singh Gill, Chatham (CA); Mohammad Abu Jubbeh, Chatham (CA); Alexander Dragojlov, Chatham (CA); Jörg Eissler, Wiesbaden (DE); Mitchell Koupal, Pontiac, MI (US); Peter Welteroth, Glashütten (DE); Armin Seeger, Glashütten (DE)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 0 days.

(21) Appl. No.: 18/156,041

(22) Filed: Jan. 18, 2023

(65) Prior Publication Data

US 2023/0235832 A1    Jul. 27, 2023

Related U.S. Application Data

(60) Provisional application No. 63/266,996, filed on Jan. 21, 2022.

(51) Int. Cl.
| | | |
|---|---|---|
| F16K 11/08 | (2006.01) | |
| F16K 11/085 | (2006.01) | |
| F16K 27/06 | (2006.01) | |

(52) U.S. Cl.
CPC ........ F16K 27/065 (2013.01); F16K 11/0856 (2013.01)

(58) Field of Classification Search
CPC ............................ F16K 27/065; F16K 11/0856
See application file for complete search history.

(56) References Cited

U.S. PATENT DOCUMENTS

| | | | | |
|---|---|---|---|---|
| 2008/0164014 A1* | 7/2008 | Nakamura | ............. | F02M 26/32 |
| | | | | 165/165 |
| 2011/0286724 A1* | 11/2011 | Goodman | ........... | F28D 20/0056 |
| | | | | 165/104.31 |

(Continued)

FOREIGN PATENT DOCUMENTS

| | | |
|---|---|---|
| WO | 2015045805 A1 | 4/2015 |
| WO | 2021004418 A1 | 1/2021 |

OTHER PUBLICATIONS

International Search Report and Written Opinion dated May 12, 2023 from corresponding International Patent Application No. PCT/US2023/060888.

(Continued)

*Primary Examiner* — Kevin R Barss

(57) ABSTRACT

A multi-port thermal module which includes a central housing, a plurality of flow cavities integrally formed as part of the central housing, at least one inner housing connected to a first side of the central housing, a first plurality of inner flow channels integrally formed as part of the first inner housing, each of the first plurality of inner flow channels in fluid communication with at least one of the flow cavities, and a first outer housing connected to the first inner housing. A portion of each of a first plurality of flow channels is integrally formed as part of the first inner housing, and another portion of each of the first plurality of flow channels is integrally formed as part of the first outer housing. A rotor located in the central housing is rotated to various orientations to direct fluid between the plurality of flow cavities.

14 Claims, 33 Drawing Sheets

(56) References Cited

U.S. PATENT DOCUMENTS

| | | | |
|---|---|---|---|
| 2012/0006436 A1 | 1/2012 | Morimoto | |
| 2013/0062042 A1* | 3/2013 | Dinulescu | F28D 9/0037 |
| | | | 165/166 |
| 2015/0027575 A1* | 1/2015 | Morein | F16K 11/165 |
| | | | 137/865 |
| 2015/0308931 A1* | 10/2015 | Toogood | B01L 7/00 |
| | | | 435/7.1 |
| 2016/0040585 A1* | 2/2016 | Schaefer | F16K 11/202 |
| | | | 137/594 |
| 2019/0364694 A1* | 11/2019 | Lin | H01L 23/473 |
| 2020/0109849 A1* | 4/2020 | Lin | F21V 29/83 |
| 2021/0006436 A1 | 1/2021 | Bull | |

OTHER PUBLICATIONS

European Search Report dated May 12, 2023 for corresponding European Patent Application No. PCT/US2023/060888.

\* cited by examiner

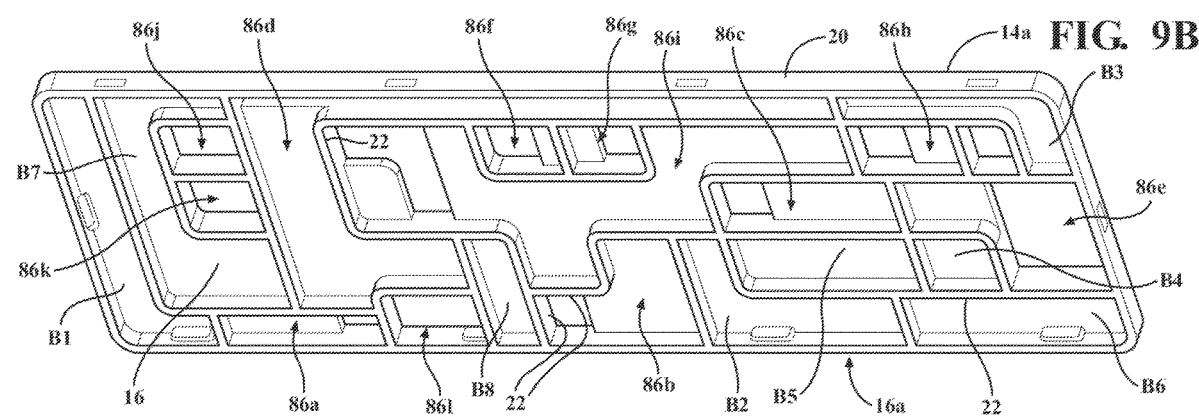
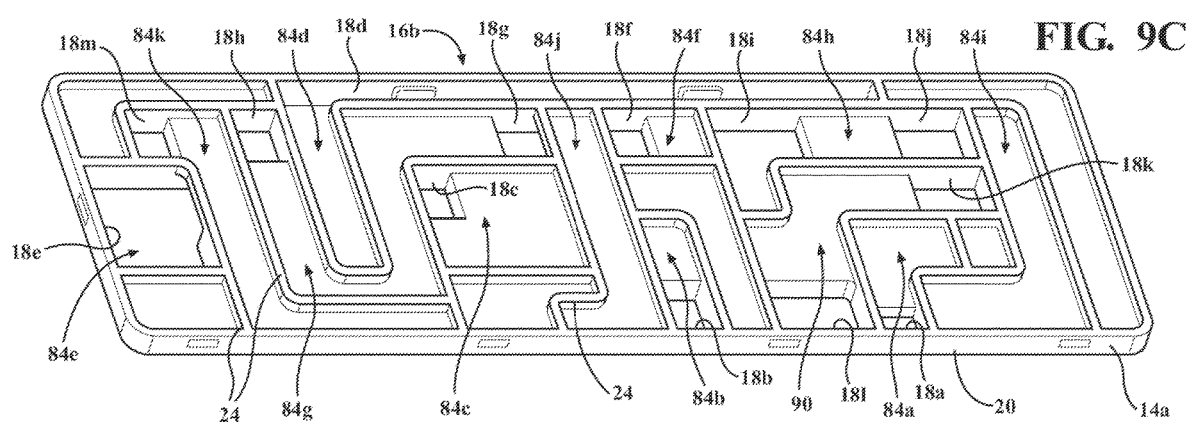

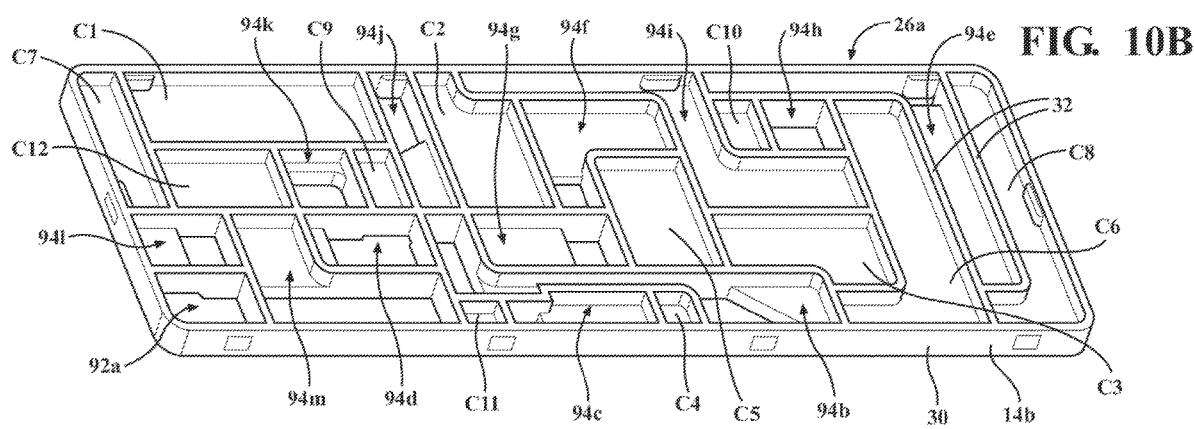
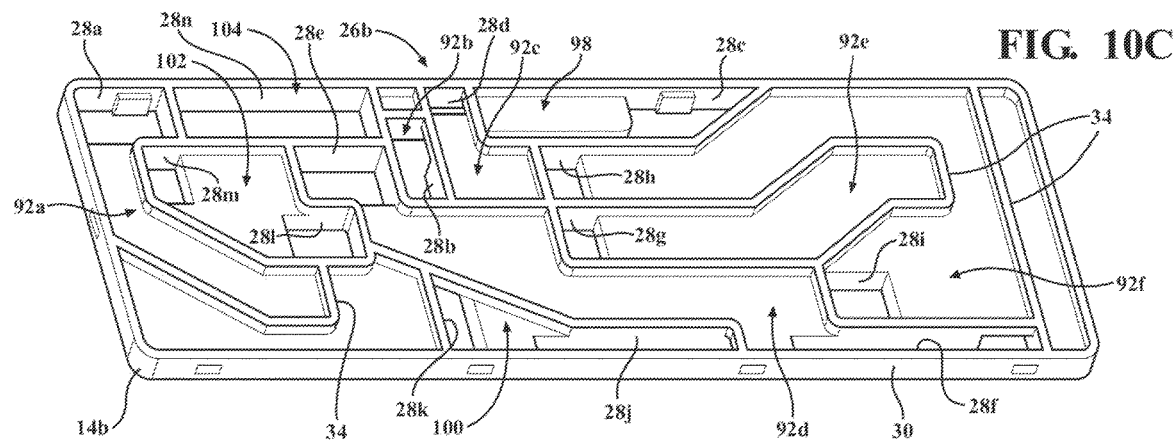

MULTI-PORT THERMAL MODULE

CROSS-REFERENCE TO RELATED APPLICATIONS

This application claims the benefit of provisional application 63/266,996, filed Jan. 21, 2022. The disclosure of the above application is incorporated herein by reference.

FIELD OF THE INVENTION

The invention relates generally to a multi-port thermal module which includes a central housing and one or more inner/outer housing portions, which when assembled together form various channels in fluid communication with one or more valves or rotors, and the rotors are used to direct fluid to various flow paths when the rotors are placed in one of a plurality of orientations.

BACKGROUND OF THE INVENTION

Multi-port valves for directing fluid through various conduits are generally known. As electric vehicles become more commonplace, and the power and range requirements increase, the need for optimized thermal management of the components of an electric vehicle has also increased. Many attempts to address the need for improved thermal management have resulted in various designs including multiple valve assemblies in various locations within the vehicle connected to multiple fluid conduits, resulting in undesirable packaging configurations. Some of these types of valves include three-port and four-port valves, where a single valve member is used to direct fluid from an inlet port to one of several outlet ports. There are also manifold style valves having multiple ports, but these designs offer very little flexibility to accommodate different flow modes and different flow paths.

These current designs require an undesirable amount of rotors, actuators, and housings to achieve a desired number of flow paths.

Accordingly, there exists a need for a multi-port thermal module which minimizes the number of actuators and rotors to achieve a desired number of flow configurations.

SUMMARY OF THE INVENTION

In an embodiment, the present invention is a multi-port thermal module, which includes a central housing, a plurality of flow cavities integrally formed as part of the central housing, a first inner housing portion connected to a first side of the central housing, a first plurality of inner flow channels integrally formed as part of the first inner housing portion, each of the first plurality of inner flow channels in fluid communication with at least one of the flow cavities, and a first outer housing portion connected to the first inner housing portion.

In an embodiment, the multi-port thermal module also includes a first plurality of flow channels, a portion of each of the first plurality of flow channels is integrally formed as part of the first inner housing portion, and another portion of each of the first plurality of flow channels is integrally formed as part of the first outer housing portion.

In an embodiment, the multi-port thermal module includes at least one valve disposed in the central housing, at least one pump in fluid communication with and operable for transferring fluid from one of the first plurality of flow channels to the valve, and at least one actuator mounted to the central housing and connected to the valve, and the actuator changes the orientation of the valve to direct fluid between two or more of the plurality of flow cavities, or direct fluid from the valve to one or more of the plurality of flow cavities.

In an embodiment, each of the first plurality of flow channels is in fluid communication with at least one of the first plurality of inner flow channels.

In an embodiment, the multi-port thermal module includes a plurality of valves, and each of the plurality of valves is disposed in a corresponding cavity of the central housing. In an embodiment, the multi-port thermal module includes a plurality of actuators mounted to the central housing and connected to a corresponding one of the plurality of valves. In an embodiment, each of the actuators changes the orientation of a corresponding one of the valves to direct fluid between two or more of the flow cavities, or to direct fluid from the a corresponding one of the valves to one or more of the flow cavities.

In an embodiment, a pump housing is connected to the first outer housing portion and the central housing, and a plurality of pumps are mounted to the pump housing. Each of the plurality of pumps is operable for transferring fluid from one of the first plurality of flow channels to a corresponding one of the valves.

In an embodiment, the multi-port thermal module includes a second inner housing portion connected to a second side of the central housing and a second plurality of inner flow channels integrally formed as part of the second inner housing portion. Each of the second plurality of inner flow channels is in fluid communication with at least one of the flow cavities.

In an embodiment, the multi-port thermal module includes a second outer housing portion connected to the second inner housing portion, and a second plurality of flow channels. Each of the second plurality of flow channels is in fluid communication with at least one of the second plurality of inner flow channels. In an embodiment, portion of each of the second plurality of flow channels is integrally formed as part of the second inner housing portion, and another portion of each of the second plurality of flow channels is integrally formed as part of the second outer housing portion.

Although it has been described above that the pump housing is connected to the first outer housing portion and the central housing, it is within the scope of the invention that in addition to the central housing, the pump housing may be connected to and in fluid communication with one or more of the first inner housing portion, the first outer housing portion, the second inner housing portion, or the second outer housing portion. The connection of the pump housing is such that the pumps are operable for transferring fluid from one or more of the various flow channels mentioned above to a corresponding one of the valves.

In an embodiment, at least one of the plurality of flow cavities is in fluid communication with one of the first plurality of inner flow channels and one of the second plurality of inner flow channels.

In an embodiment, one or more of the plurality of flow cavities extends through the central housing.

In an embodiment, one of the first plurality of inner flow channels is in fluid communication with at least two of the plurality of flow cavities integrally formed as part of the central housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9B is a first perspective view of a first inner housing portion which is part of a multi-port thermal module, according to embodiments of the present invention;

FIG. 9C is a second perspective view of a first inner housing portion which is part of a multi-port thermal module, according to embodiments of the present invention;

FIG. 10B is a first perspective view of a second inner housing portion which is part of a multi-port thermal module, according to embodiments of the present invention;

FIG. 10C is a second perspective view of a second inner housing portion which is part of a multi-port thermal module, according to embodiments of the present invention;

DETAILED DESCRIPTION OF THE PREFERRED EMBODIMENTS

Figure 1:
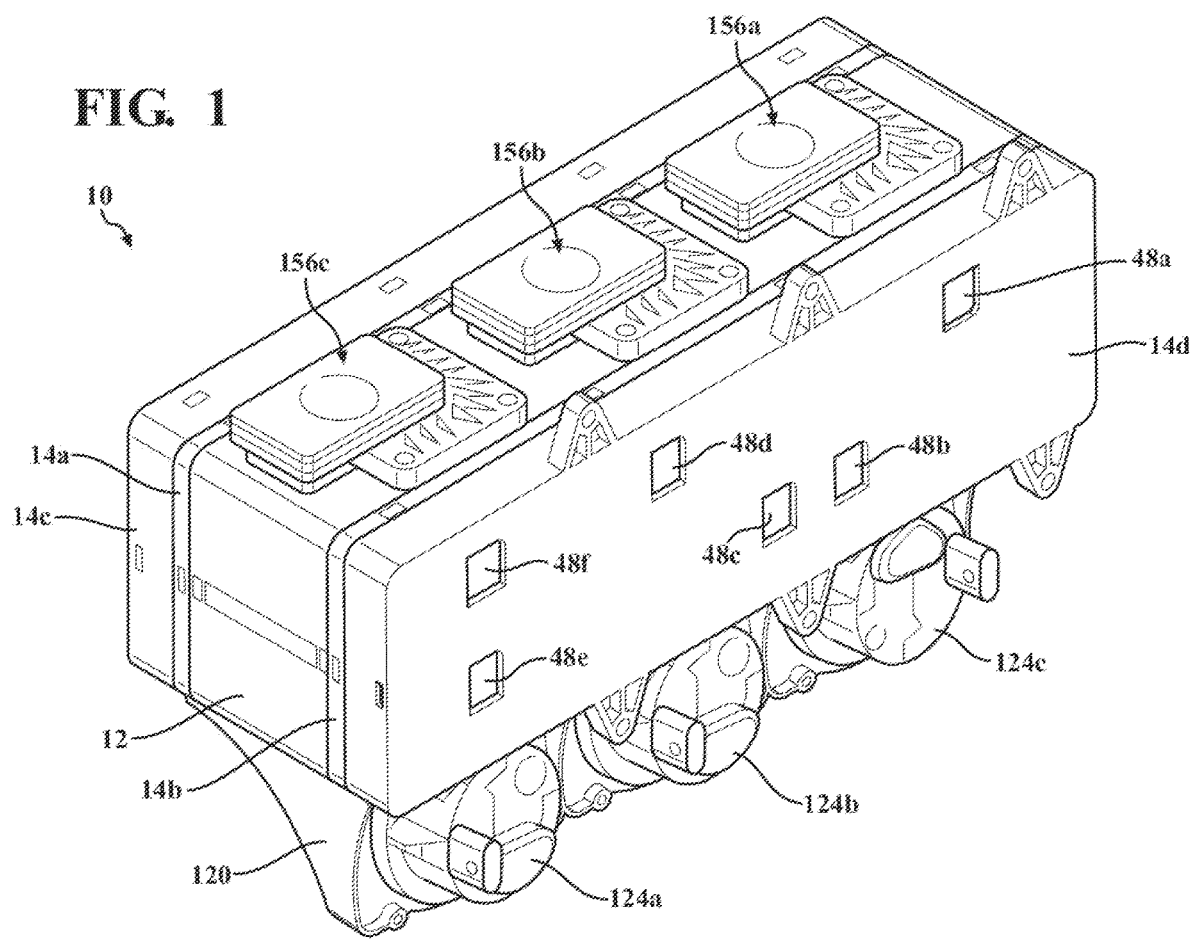
FIG. 1 is a first perspective view of a multi-port thermal module, according to embodiments of the present invention.

The following description of the preferred embodiment(s) is merely exemplary in nature and is in no way intended to limit the invention, its application, or uses.

A first embodiment of a multi-port thermal module is shown in the Figures generally at 10. With specific reference to FIGS. 1-6, the multi-port thermal module 10 includes a central housing 12, and connected to the central housing 12 are several housing portions 14a,14b,14c,14d. More specifically, connected to the central housing is a first inner housing portion 14a, and a second inner housing portion 14b. Connected to the first inner housing portion 14a is a first outer housing portion 14c and connected to the second inner housing portion 14b is a second outer housing portion 14d.

Figure 9A:
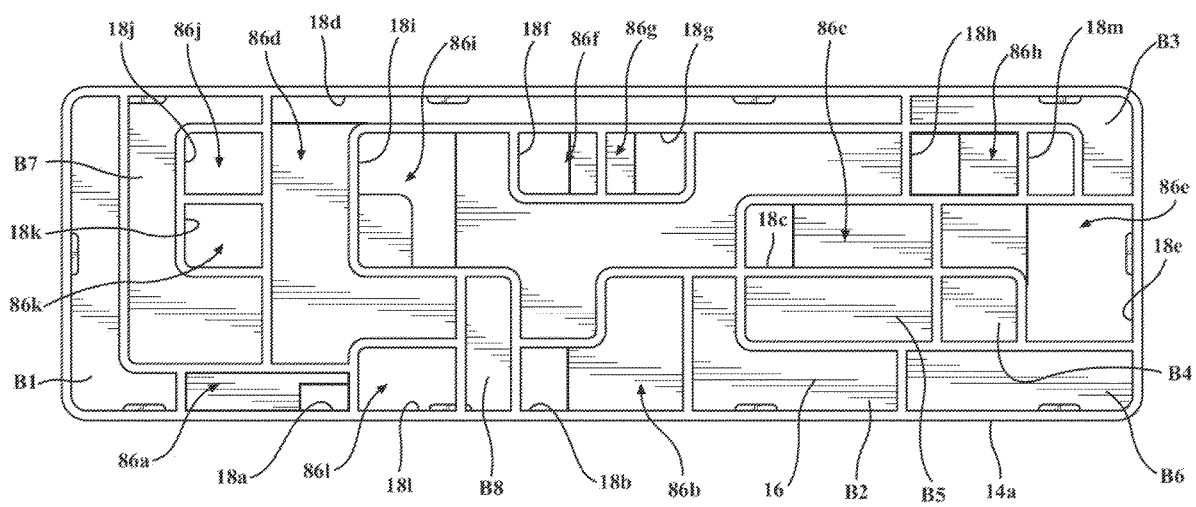
FIG. 9A is a side view of a first inner housing portion which is part of a multi-port thermal module, according to embodiments of the present invention.

Referring to FIGS. 9A-9C, the first inner housing portion 14a includes a central wall 16, and integrally formed with the central wall 16 is a plurality of apertures 18a-18m. Integrally formed with and extending away from the central wall 16 is a circumferential exterior wall 20. There are also several walls, several of which are referenced at 22, which protrude away from an inner side, shown generally at 16a, of the central wall 16. There are also several more walls, several of which are referenced at 24, integrally formed as part of and protrude away from an outer side, shown generally at 16b, of the central wall 16.

Figure 10A:
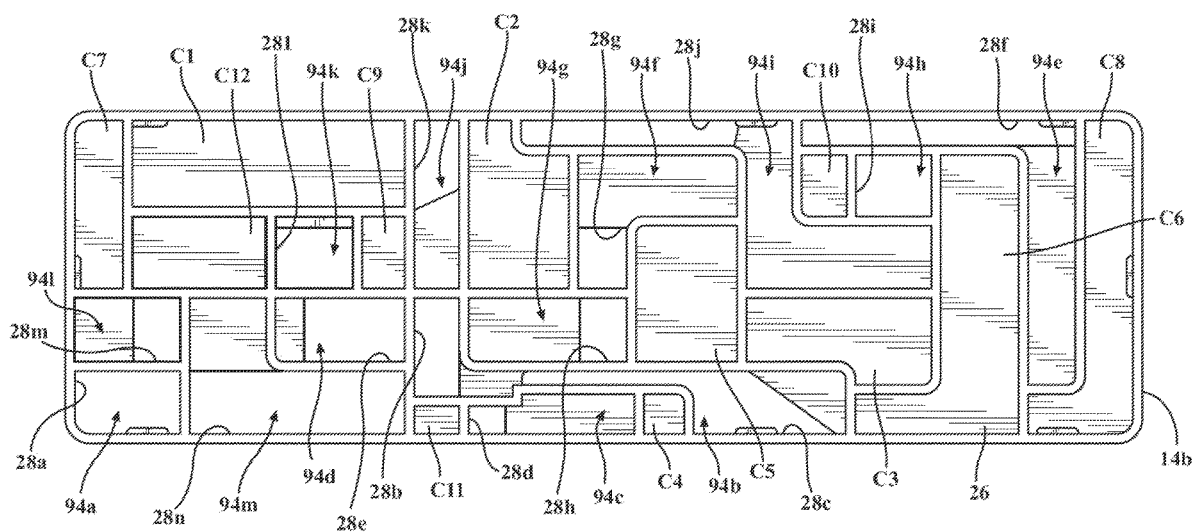
FIG. 10A is a side view of a second inner housing portion which is part of a multi-port thermal module, according to embodiments of the present invention.

Referring to FIGS. 10A-10C, the second inner housing portion 14b includes a central wall 26, and integrally formed with the central wall 26 is a plurality of apertures 28a-28n. Integrally formed with and extending away from the central wall 26 is a circumferential exterior wall 30. There are also several walls, several of which are referenced at 32, which protrude away from an inner side, shown generally at 26a, of the central wall 26. There are also several more walls, several of which are referenced at 34, integrally formed as part of and protrude away from an outer side, shown generally at 26b, of the central wall 26.

Figure 11A:
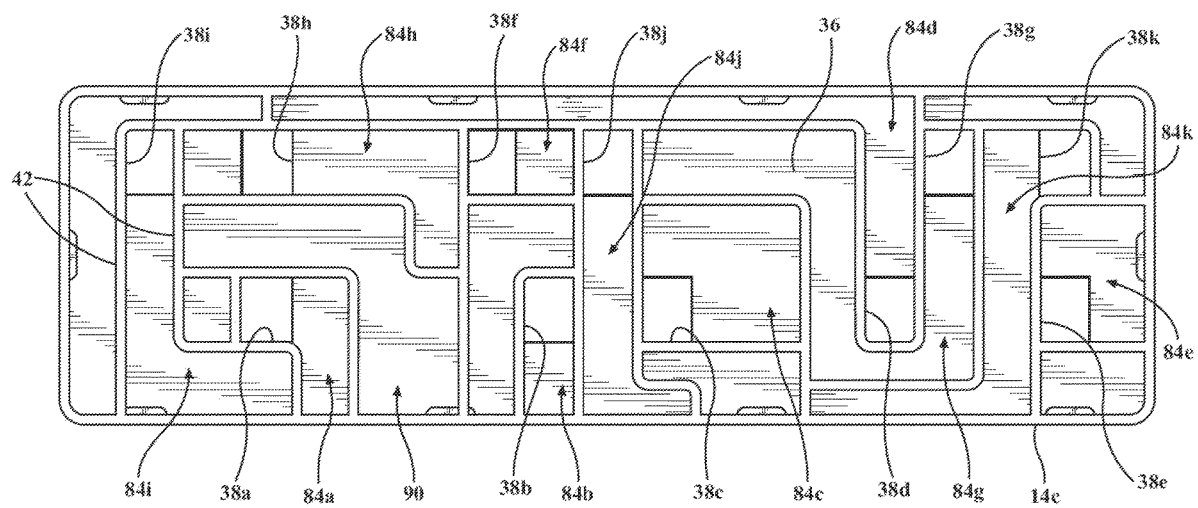
FIG. 11A is a side view of a first outer housing portion which is part of a multi-port thermal module, according to embodiments of the present invention.
Figure 11B:
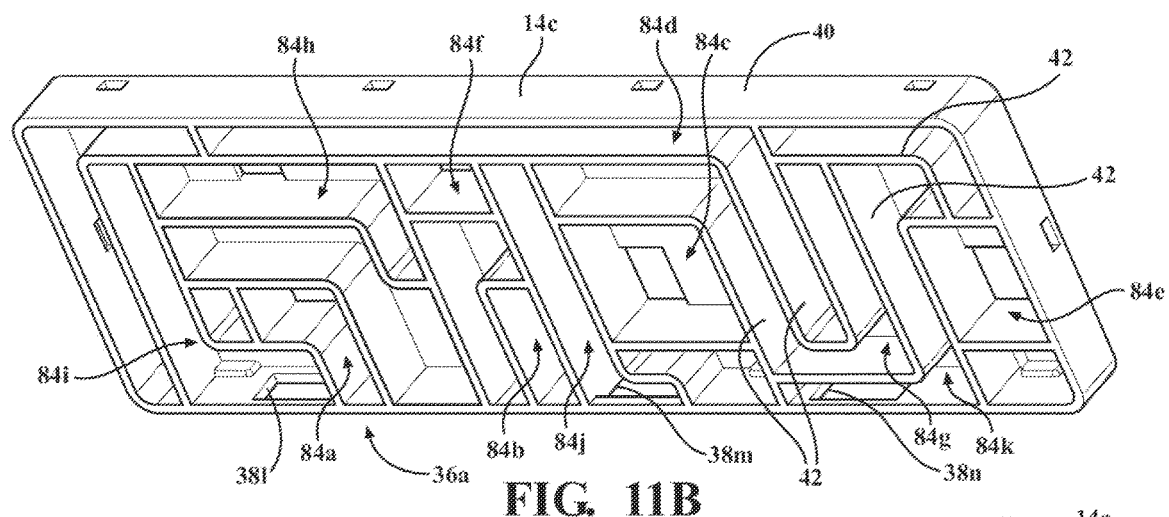
FIG. 11B is a first perspective view of a first outer housing portion which is part of a multi-port thermal module, according to embodiments of the present invention.
Figure 11C:
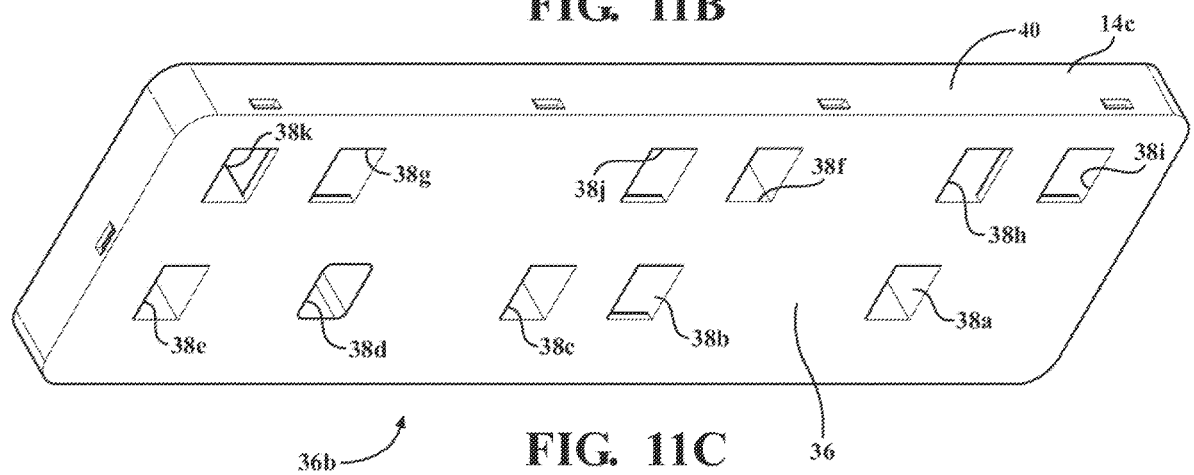
FIG. 11C is a second perspective view of a first outer housing portion which is part of a multi-port thermal module, according to embodiments of the present invention.

Referring to FIGS. 11A-11C, the first outer housing portion 14c includes a wall portion 36, and integrally formed with the wall portion 36 is a plurality of apertures 38a-38k. Integrally formed with and extending away from the wall portion 36 is a circumferential exterior wall 40, and there are three apertures 38l,38m,38n integrally formed as part of the circumferential exterior wall 40. There are also several walls, several of which are referenced at 42, which protrude away from an inner side, shown generally at 36a, of the wall portion 36. There are also several conduits (not shown) which attach to an outer side, shown generally at 36b, of the wall portion 36 such that each conduit is in fluid communication with one of the apertures 38a-38k.

Figure 12A:
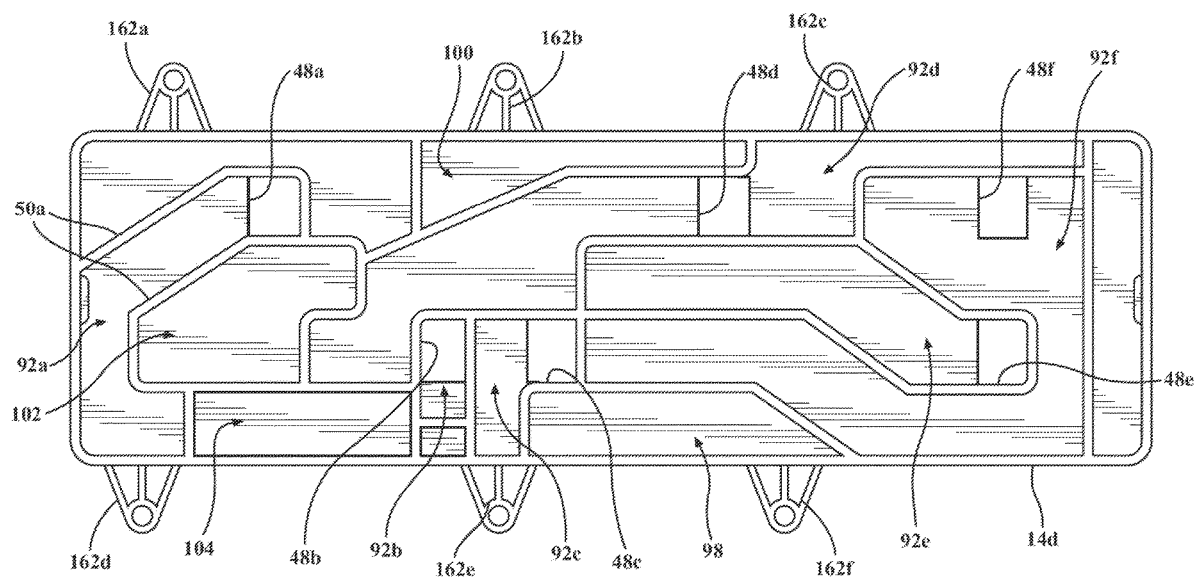
FIG. 12A is a side view of a second outer housing portion which is part of a multi-port thermal module, according to embodiments of the present invention.
Figure 12B:
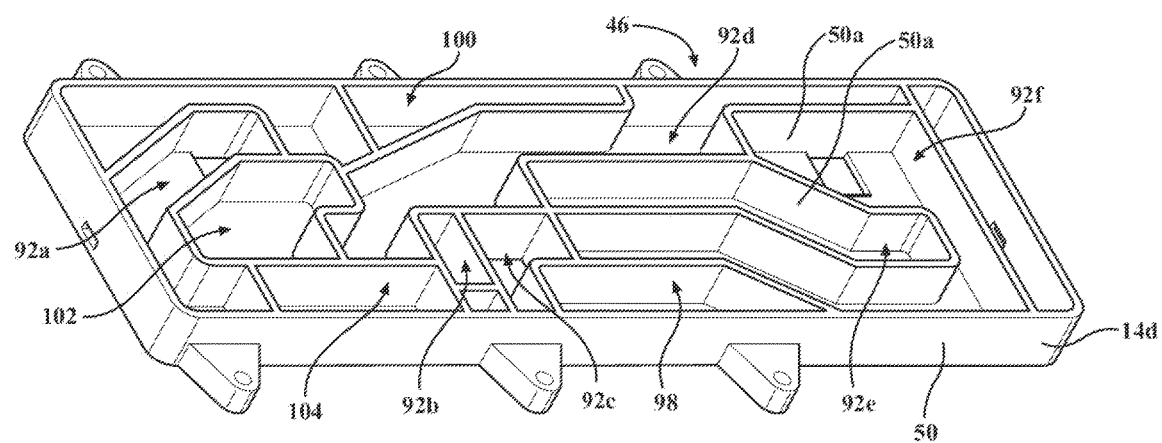
FIG. 12B is a first perspective view of a second outer housing portion which is part of a multi-port thermal module, according to embodiments of the present invention.
Figure 12C:
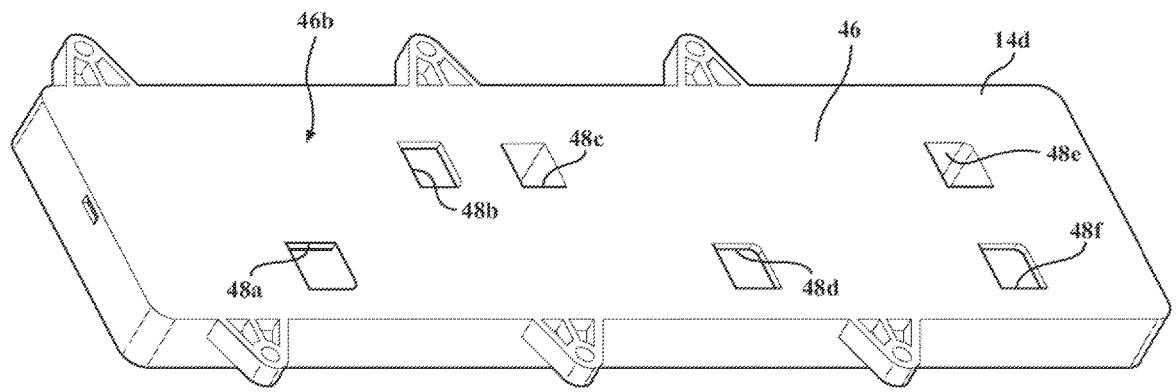
FIG. 12C is a second perspective view of a second outer housing portion which is part of a multi-port thermal module, according to embodiments of the present invention.

Referring to FIGS. 12A-12C, the second outer housing portion 14d includes a wall portion 46, and integrally formed with the wall portion 46 is a plurality of apertures 48a,48b,48c,48d,48e,48f. Integrally formed with and extending away from the wall portion 46 is a circumferential exterior wall 50. There are also several walls, several of which are referenced at 50a, which protrude away from an inner side, shown generally at 46a, of the wall portion 46. There are also several conduits (not shown) which attach to an outer side, shown generally at 46b, of the wall portion 46 such that each conduit is in fluid communication with one of the apertures 48a,48b,48c,48d,48e,48f.

Referring to FIGS. 7A-8B, the central housing 12 also includes an exterior circumferential wall 52. Integrally formed as part of the central housing 12 is a first cylindrical cavity, shown generally at 54a, a second cylindrical cavity, shown generally at 54b, and a third cylindrical cavity, shown generally at 54c. Integrally formed as part of the side wall 56a of the first cylindrical cavity 54a is a plurality of apertures 58a-58l. There is also an aperture 58m (shown in FIG. 13B) integrally formed with a lower wall 158a of the first cylindrical cavity 54a. Integrally formed as part of the side wall 56b of the second cylindrical cavity 54b is another plurality of apertures 60a-60l. Additionally, an aperture 60m (shown in FIG. 13B) is integrally formed with a lower wall 158b of the second cylindrical cavity 54b. Integrally formed as part of the side wall 56c of the third cylindrical cavity 54c is a third plurality of apertures 62a-62l. Also, an aperture 62m (shown in FIG. 13B) is integrally formed with a lower wall 158c of the third cylindrical cavity 54c.

The multi-port thermal module 10 also includes several valve assemblies, and each valve assembly includes at least one valve which is controlled by a corresponding actuator assembly, which in this embodiment is a rotor disposed in each cylindrical cavity 54a,54b,54c. More specifically and with reference to FIGS. 7A-8B and 16A-18C, disposed in each cylindrical cavity 54a,54b,54c is a corresponding rotor 64a,64b,64c, the function of which will be described later. Each rotor 64a,64b,64c has channels which facilitate the flow of fluid between multiple levels. In the embodiment shown, the fluid may flow between a first level, shown generally at 66a, a second level, shown generally at 66b, and a third level, shown generally at 66c, a fourth level, shown generally at 66d, and a fifth level, shown generally at 66e.

The first level 66a and the second level 66b are separated by a first plane 68a, where the first level 66a is on one side of the first plane 68a, and the second level 66b is on the opposite side of the first plane 68a as the first level 66a. The second level 66b and the third level 66c are separated by a second plane 68b, where the second level 66b is on the opposite side of the second plane 68b as the third level 66c. The third level 66c and the fourth level 66d are separated by a third plane 68c, where the third level 66c is on the opposite side of the third plane 68c as the fourth level 66d. The fourth level 66d and the fifth level 66e are separated by a fourth plane 68d, where the fourth level 66d is on the opposite side of the fourth plane 68d as the fifth level 66e.

The central housing 12 also includes various horizontal walls, several of which are referenced at 70, and vertical walls, several of which are referenced at 74, as well as several transverse walls, several of which are referenced at 78, which are integrally formed with one another, with the sidewalls 56a,56b,56c, and with the exterior circumferential wall 52, such that the central housing 12 has various flow cavities.

Referring again to FIGS. 9A-9C and 11A-11C, when assembled, the first inner housing portion 14a is connected to the first outer housing portion 14c. During assembly, the circumferential exterior wall 20 of the first inner housing portion 14a is in contact with the circumferential exterior wall 40 of the first outer housing portion 14c. Also, the walls 24 which protrude away from the outer side 16b of the central wall 16 of the first inner housing portion 14a are in contact with the walls 42 which protrude away from the inner side 36a of the wall portion 36 of the first outer housing portion 14c. To connect the first inner housing portion 14a to the first outer housing portion 14c, one of the first inner housing portion 14a or the first outer housing portion 14c are heated, such that either the circumferential exterior wall 20 and the walls 24, or the circumferential exterior wall 40 and the walls 42, undergo a slight melting process. This results in the circumferential exterior wall 20 being joined to the circumferential exterior wall 40 after cooling, and the walls 24 being joined to the walls 42 after cooling.

The first inner housing portion 14a is connected to the first side 12a of the central housing 12 in similar manner. More specifically, during assembly, the circumferential exterior wall 20 of the first inner housing portion 14a is in contact with the exterior circumferential wall 52 of the central housing 12, and the walls 22 which protrude away from the inner side 16a of the first inner housing portion 14a are in contact with several of the horizontal walls 70 and vertical walls 74 of the first side 12a of the central housing 12. To connect the first inner housing portion 14a to the central housing 12, one of the first inner housing portion 14a or the central housing 12 are heated, such that either the circumferential exterior wall 20 and the walls 22, or the circumferential exterior wall 52 and the walls 70,74 undergo a slight melting process. This results in the circumferential exterior wall 20 being joined to the circumferential exterior wall 52 after cooling, and the walls 22 being joined to the walls 70,74 after cooling. The first inner housing portion 14a may be joined to the first outer housing portion 14c during a separate process from the first inner housing portion 14a being joined to the central housing 12, or the first inner housing portion 14a, the first outer housing portion 14c, and the central housing 12 may be joined together during a single assembly step of heating and cooling.

In another embodiment, the first inner housing portion 14a and the second inner housing portion 14b may be joined to the central housing 12 during a single manufacturing step, using any suitable process, such as, but not limited to, hot gas welding, infrared, or hot plate welding, or any other suitable welding process. In other embodiments, other processes, such as material deformation processes (other than various types of welding), may be used to connect the first inner housing portion 14a and the second inner housing portion 14b, to the central housing 12.

Figure 13A:
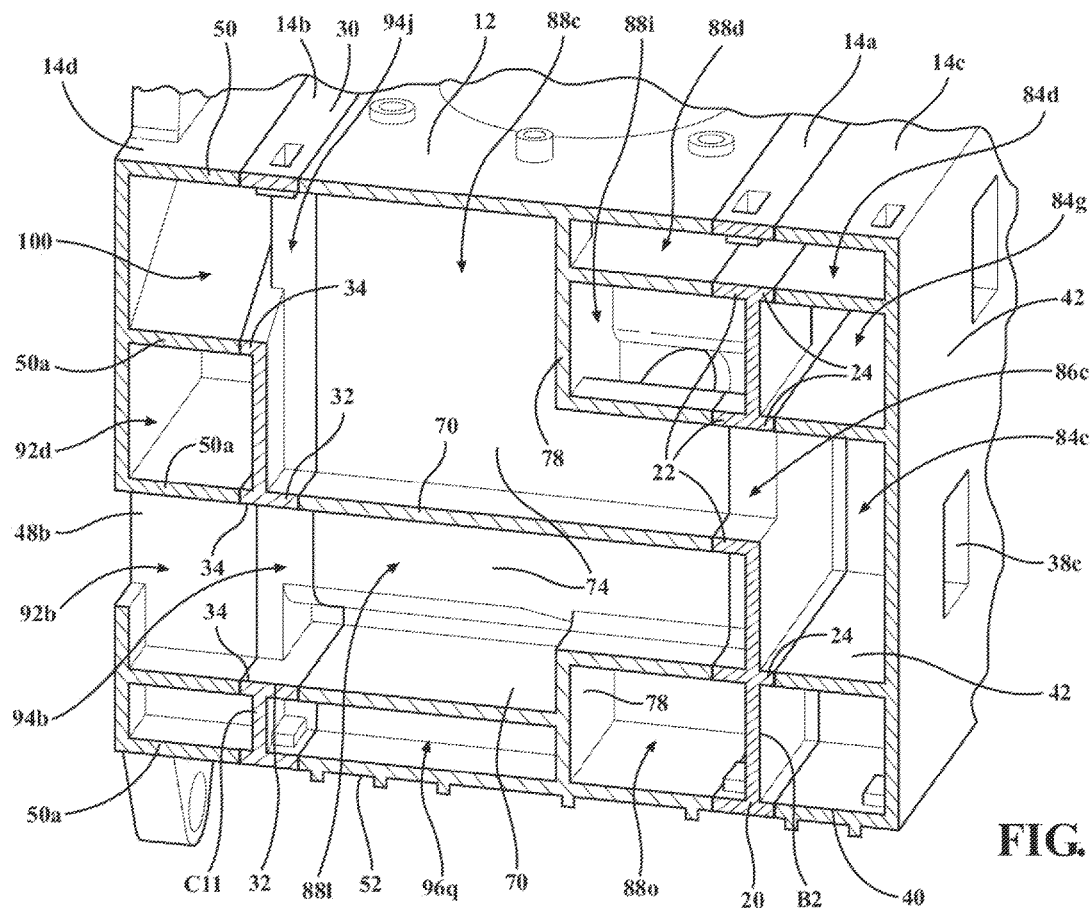
FIG. 13A is a sectional view taken along line 13A-13A of FIG. 1.
Figure 13B:
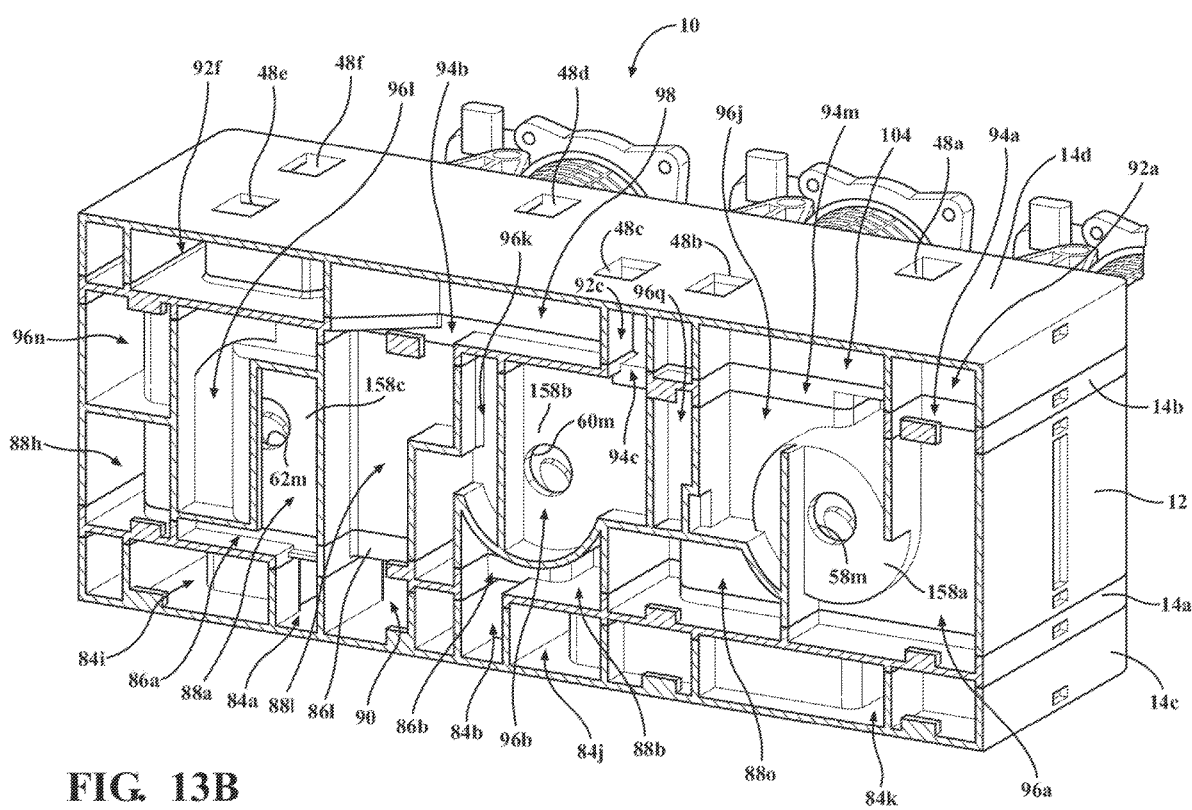
FIG. 13B is a sectional view taken along line 13B-13B of FIG. 1.

Each of the apertures 38a-38n of the first outer housing portion 14c is in fluid communication with at least one flow channel 84a-84k. The flow channels 84a-84k are formed by the connection of the first inner housing 14a to the first outer housing portion 14c described above, where the walls 42 of the inner side 36a of the wall portion 36 are connected to the walls 24 of the outer side 16b of the central wall 16, such that each flow channel 84a-84k is separated by the walls 24,42. Each flow channel 84a-84k is therefore formed by a portion of the first inner housing 14a and the first outer housing portion 14c. This is shown in FIGS. 13A and 13B.

Referring again to FIGS. 9A-9C and 11A-11C, each of the apertures 18a-18m of the first inner housing portion 14a is in fluid communication with at least one inner flow channel 86a-86l, where the inner flow channels 86a-86l are separated by at least one of the walls several walls 22 which protrude away from the inner side 16a of the central wall 16. As previously mentioned, the walls 22 are in contact with the horizontal walls 70 and vertical walls 74 of the first side 12a of the central housing 12. The flow channels 84a-84k provide fluid communication between the apertures 38a-38n of the first outer housing portion 14c and the apertures 18a-18m of the first inner housing portion 14a, and the inner flow channels 86a-86l provide fluid communication between the apertures 18a-18m of the first inner housing portion 14a and various flow cavities of the central housing 12, achieving various flow paths which are further described below.

The central housing 12 has a first plurality of cavities 88a-88q. Some of the cavities are flow cavities 88a-88q, which are in fluid communication with the various inner flow channels 86a-86l, which is described in more detail below. The thirteenth cavity 88m is in fluid communication with the aperture 18m, but is not part of a flow path, and no fluid passes through the cavity 88m so as to allow desired pressure to build. Some of the cavities 88n,88o,88p are unused and are not in fluid communication with one of the inner flow channels 86a-86l, such that no fluid passes through. The cavity 88q is also a cavity through which no fluid passes, but is in fluid communication with the first rotor 64a through the aperture 58l to allow for a desired pressure to build. Some of the first plurality of cavities 88a-88q are located on the first side 12a of the central housing 12. Several of the flow cavities 88c, 88d, 88e, 88l, have portions integrally formed on both sides 12a,12b of the central housing 12.

The central housing 12 also has a second plurality of cavities 96a-96r. Some of the cavities are flow cavities 96a-96j, which are in fluid communication with the various inner flow channels 94a-94m, which is described in more detail below. Referring to FIGS. 7A-8B and 14, there are three apertures 106a,106b,106c integrally formed as part of the exterior circumferential wall 52. In addition to being in fluid communication with the inner flow channel 94m, the flow cavity 96j is in fluid communication with the first aperture 106a. The eleventh flow cavity 96k is in fluid communication with the aperture 106b, and the twelfth flow cavity 96l is in fluid communication with the third aperture 106c. Some of the cavities 96m,96n,96o,96p,96q are unused and are not in fluid communication with one of the inner flow channels 94a-94m or apertures 106a,106b,106c such that no fluid passes through. The cavity 96r is also a cavity through which no fluid passes, but is in fluid communication with the first rotor 64a through the aperture 58e to allow desired pressure to build. Some of the second plurality of cavities 96b,96c,96e-96h,96i,96j,96l-96r are located on the second side 12b of the central housing 12. Several of the second plurality of cavities 96a, 96d, 96k have portions integrally formed on both sides 12a,12b of the central housing 12.

Referring to FIGS. 7A-8B, 9A-9C, and 11A-11C, the first aperture 38a of the first outer housing portion 14c is in fluid communication with a first flow channel, shown generally at 84a, and the first flow channel 84a is in fluid communication with a first inner flow channel, shown generally at 86a, through the aperture 18a of the first inner housing portion 14a. The first inner flow channel 86a of the first inner housing portion 14a is in fluid communication with a first flow cavity, shown generally at 88a, of the first side 12a of the central housing 12. Therefore, there is a flow path between the first aperture 38a and the first flow cavity 88a.

The first flow cavity 88a is in fluid communication with the aperture 62m of the cylindrical cavity 54c.

The second aperture 38b of the first outer housing portion 14c is in fluid communication with a second flow channel, shown generally at 84b, and the second flow channel 84b is in fluid communication with a second inner flow channel, shown generally at 86b, through the aperture 18b of the first inner housing portion 14a. The second inner flow channel 86b of the first inner housing portion 14a is in fluid communication with a second flow cavity, shown generally at 88b, of the first side 12a of the central housing 12. This results in a flow path between the second aperture 38b and the second flow cavity 88b.

The third aperture 38c of the first outer housing portion 14c is in fluid communication with a third flow channel, shown generally at 84c, and the third flow channel 84c is in fluid communication with a third inner flow channel, shown generally at 86c, through the aperture 18c of the first inner housing portion 14a. The third inner flow channel 86c is in fluid communication with the portion of a third flow cavity, shown generally at 88c, located on the first side 12a of the central housing 12. This results in a flow path between the third aperture 38c and the third flow cavity 88c.

The fourth aperture 38d of the first outer housing portion 14c is in fluid communication with a fourth flow channel, shown generally at 84d. The fourth flow channel 84d is in fluid communication with a fourth inner flow channel, shown generally at 86d, of the first inner housing portion 14a, through the aperture 18d. The fourth inner flow channel 86d is in fluid communication with the portion of a fourth flow cavity, shown generally at 88d, located on the first side 12a of the central housing 12. This results in a flow path between the fourth aperture 38d and the fourth flow cavity 88d.

The fifth aperture 38e of the first outer housing portion 14c is in fluid communication with a fifth flow channel, shown generally at 84e. The fifth flow channel 84e is in fluid communication with a fifth inner flow channel, shown generally at 86e, through the aperture 18e of the first inner housing portion 14a. The fifth inner flow channel 86e is in fluid communication with the portion of the fifth flow cavity, shown generally at 88e, located on the first side 12a of the central housing 12. This results in a flow path between the fifth aperture 38e and the fifth flow cavity 88e.

The sixth aperture 38f of the first outer housing portion 14c is in fluid communication with a sixth flow channel, shown generally at 84f, and the sixth flow channel 84f is in fluid communication with a sixth inner flow channel, shown generally at 86f, through the aperture 18f of the first inner housing portion 14a. The sixth inner flow channel 86f is in fluid communication with a sixth flow cavity, shown generally at 88f, of the first side 12a of the central housing 12. This results in a flow path between the sixth aperture 38f and the sixth flow cavity 88f.

The seventh aperture 38g of the first outer housing portion 14c is in fluid communication with a seventh flow channel, shown generally at 84g. The seventh flow channel 84g is in fluid communication with a seventh inner flow channel, shown generally at 86g, through the aperture 18g of the first inner housing portion 14a, and an eighth inner flow channel, shown generally 86h, through the aperture 18h of the first inner housing portion 14a. The seventh inner flow channel 86g is in fluid communication with a seventh flow cavity, shown generally at 88g, of the first side 12a of the central housing 12, and the eighth inner flow channel 86h is in fluid communication with an eighth flow cavity, shown generally at 88h, of the first side 12a of the central housing 12. This results in flow paths between the seventh aperture 38g and the seventh flow cavity 88g, and also between the seventh aperture 38g the eighth flow cavity 88h.

The eighth aperture 38h of the first outer housing portion 14c is in fluid communication with an eighth flow channel, shown generally at 84h. The eighth flow channel 84h is in fluid communication with a ninth inner flow channel, shown generally at 86i, through the aperture 18i of the first inner housing portion 14a. The eighth flow channel 84h is also in fluid communication with a tenth inner flow channel, shown generally at 86j, through the aperture 18j of the first inner housing portion 14a. The ninth inner flow channel 86i is in fluid communication with a ninth flow cavity, shown generally at 88i, of the first side 12a of the central housing 12, and the tenth inner flow channel 86j is in fluid communication with a tenth flow cavity, shown generally at 88j, of the first side 12a of the central housing 12. This results in flow paths between the eighth aperture 38h and the ninth flow cavity 88i, and also between the eighth aperture 38h and the tenth flow cavity 88j.

The ninth aperture 38i of the first outer housing portion 14c is in fluid communication with a ninth flow channel, shown generally at 84i, and the flow channel 84i is in fluid communication with the twelfth aperture 38l formed as part of the circumferential exterior wall 40, such that there is a flow path between the ninth aperture 38i and the twelfth aperture 38l.

The tenth aperture 38j of the first outer housing portion 14c is in fluid communication with a tenth flow channel, shown generally at 84j. The tenth flow channel 84j is in fluid communication with the thirteenth aperture 38m, formed as part of the circumferential exterior wall 40, such that there is a flow path between the tenth aperture 38j and the thirteenth aperture 38m.

The eleventh aperture 38k is in fluid communication with an eleventh flow channel, shown generally at 84k of the first outer housing portion 14c. The eleventh flow channel 84k is in fluid communication with the fourteenth aperture 38n, formed as part of the circumferential exterior wall 40. The eleventh flow channel 84k is also in fluid communication with the thirteenth cavity 88m of the first side 12a of the central housing 12, through the aperture 18m of the first inner housing portion 14a. However, the cavity 88m is not part of any flow path, as such the cavity 88m only functions to limit flow and maintain fluid pressure. This results in flow paths between the eleventh aperture 38k and the fourteenth aperture 38n, and also between the eleventh aperture 38k and the cavity 88m. In alternate embodiments, the cavity 88m may shaped to be in fluid communication with other cavities (such as for example the cavity 88h) to provide additional flow paths.

In addition to the flow channels 84a-84k, a cavity, shown generally at 90, is formed by the connection of the first inner housing 14a to the first outer housing portion 14c described above, where the walls 42 of the inner side 36a of the wall portion 36 are connected to the walls 24 of the outer side 16b of the central wall 16, such that the cavity 90 is separated from the flow channels 84a-84k by the walls 24,42. The cavity 90 is also therefore formed by a portion of the first inner housing 14a and the first outer housing portion 14c. The cavity 90 is in fluid communication with an eleventh inner flow channel, shown generally at 86k, through the aperture 18k of the first inner housing portion 14a. The cavity 90 is also in fluid communication with a twelfth inner flow channel, shown generally at 86l, through the aperture 18l of the of the first inner housing portion 14a. The eleventh inner flow channel 86k is in fluid communication with an eleventh flow cavity, shown generally at 88k, of the first side 12a of the central housing 12, and the twelfth inner flow channel 86l is in fluid communication with the portion of the twelfth flow cavity 88l located on the first side 12a of the central housing 12. This results in a flow path between the eleventh flow cavity 88k and the twelfth flow cavity 88l.

There are several cavities of the first side 12a of the central housing 12 which are unused, or fluid does not pass through to provide fluid pressure. Several areas of the central wall 16 of the first inner housing portion 14a function as backing areas, or backing plates, for a corresponding one of the cavities of the first side 12a of the central housing 12. More specifically, there are several cavities, shown generally at 88n,88o,88p, respectively, which are part of the central housing 12, where no fluid passes through these cavities 88n,88o,88p. There is also a cavity, shown generally at 88q, through which no fluid passes, but is in fluid communication with the first rotor 64a through the aperture 58l. The first inner housing portion 14a includes a first backing plate B1 which encloses the cavity 88n, a second backing plate B2 which encloses the cavity 88o, and a third backing plate B3 which encloses the cavity 88p. A fourth backing plate B4 of the first inner housing portion 14a encloses the cavity 88q. The first inner housing portion 14a also includes a fifth backing plate B5 which encloses the flow cavity 88l, a sixth backing plate B6 which encloses the cavity 96a, a seventh backing plate B7 which encloses the fourth flow cavity 96d, and an eighth backing plate B8 which encloses the flow cavity 96k.

Referring again to FIGS. 10A-10C and 12A-12C, also when assembled, the first inner housing portion 14a is connected to the first outer housing portion 14c. During assembly, the circumferential exterior wall 30 of the second inner housing portion 14b is in contact with the circumferential exterior wall 50 of the second outer housing portion 14d. Also, the walls 34 which protrude away from the outer side 26b of the central wall 26 of the second inner housing portion 14b are in contact with the walls 50a which protrude away from the inner side 46a of the wall portion 46 of the second outer housing portion 14d. To connect the second inner housing portion 14b to the second outer housing portion 14d, one of the second inner housing portion 14b or the second outer housing portion 14d are heated, such that either the circumferential exterior wall 30 and the walls 34, or the circumferential exterior wall 50 and the walls 50a undergo a slight melting process. This results in the circumferential exterior wall 30 being joined to the circumferential exterior wall 50 after cooling, and the walls 34 being joined to the walls 50a after cooling.

The second inner housing portion 14b is connected to the second side 12b of the central housing 12 in similar manner. More specifically, during assembly, the circumferential exterior wall 30 of the second inner housing portion 14b is in contact with the exterior circumferential wall 52 of the central housing 12, and the walls 32 which protrude away from the inner side 26a of the second inner housing portion 14b are in contact with several of the horizontal walls 70 and vertical walls 74 of the second side 12b of the central housing 12. To connect the second inner housing portion 14b to the central housing 12, one of the second inner housing portion 14b or the central housing 12 are heated, such that either the circumferential exterior wall 30 and the walls 32, or the circumferential exterior wall 52 and the walls 70,74 undergo a slight melting process. This results in the circumferential exterior wall 30 being joined to the circumferential exterior wall 52 after cooling, and the walls 32 being joined to the walls 70,74 after cooling. The second inner housing portion 14b may be joined to the second outer housing portion 14d during a separate process from the second inner housing portion 14b being joined to the central housing 12, or the second inner housing portion 14b, the second outer housing portion 14d, and the central housing 12 may be joined together during a single assembly step of heating and cooling. Furthermore, the first inner housing portion 14a, the second inner housing portion 14b, the first outer housing portion 14c, the second outer housing portion 14d, and the central housing 12 may be joined together during a single manufacturing step, using any suitable process, such as, but not limited to, hot gas welding, infrared, or hot plate welding, or any other suitable welding process. In other embodiments, other processes, such as material deformation processes (other than various types of welding), may be used to connect the first inner housing portion 14a, the second inner housing portion 14b, the first outer housing portion 14c, the second outer housing portion 14d, and the central housing 12.

Each of the apertures 48a,48b,48c,48d,48e,48f of the second outer housing portion 14d is in fluid communication with at least one flow channel 92a,92b,92c,92d,92e,92f. The flow channels 92a,92b,92c,92d,92e,92f are formed by the connection of the second inner housing 14b to the second outer housing portion 14d described above, where the walls 50a of the inner side 46a of the wall portion 46 are connected to the walls 34 of the outer side 26b of the central wall 26, such that each flow channel 92a,92b,92c,92d,92e,92f is separated by the walls 34,50a. Each flow channel 92a,92b,92c,92d,92e,92f is therefore formed by a portion of the second inner housing 14b and the second outer housing portion 14d. This is shown in FIGS. 13A and 13B.

Referring again to FIGS. 10A-10C and 12A-12C, in addition to the flow channels 92a,92b,92c,92d,92e,92f, several cavities, shown generally at 98,100,102,104 respectively, are formed by the connection of the second inner housing 14b to the second outer housing portion 14d described above, where the walls 50a of the inner side 46a of the wall portion 46 are connected to the walls 34 of the outer side 26b of the central wall 26, such that the cavities 98,100,102,104 are separated from the flow channels 92a, 92b,92c,92d,92e,92f by the walls 34,50a. Each cavity 98,100,102,104 is therefore formed by a portion of the second inner housing 14b and the second outer housing portion 14d.

Each of the apertures 28a-28n of the second inner housing portion 14b is in fluid communication with at least one inner flow channel 94a-94m, where the inner flow channels 94a-94m are separated by at least one of the walls 32 which protrude away from the inner side 26a of the central wall 26. As previously mentioned, the walls 32 are in contact with the horizontal walls 70 and vertical walls 74 of the second side 12b of the central housing 12. The flow channels 92a,92b,92c,92d,92e,92f provide fluid communication between the apertures 48a,48b,48c,48d,48e,48f of the second outer housing portion 14d and the apertures 28a-28n of the second inner housing portion 14b, and the inner flow channels 94a-94m provide fluid communication between the apertures 28a-28n of the second inner housing portion 14b and various flow cavities of the central housing 12, achieving various flow paths which are further described below.

Referring to FIGS. 7A-8B, 10A-10C, and 12A-12C, the first aperture 48a of the second outer housing portion 14d is fluid communication with a first flow channel, shown generally at 92a, and the first flow channel 92a is in fluid communication with a first inner flow channel, shown generally at 94a, through the first aperture 28a of the second inner housing portion 14*b*. The first inner flow channel 94*a* is in fluid communication with the portion of a first flow cavity, shown generally at 96*a*, located on the second side 12*b* of the central housing 12. This results in a flow path between the first aperture 48*a* and the first flow cavity 96*a*. The first flow cavity 96*a* is in fluid communication with the aperture 58*m* of the cylindrical cavity 54*a*.

The second aperture 48*b* of the second outer housing portion 14*d* is in fluid communication with a second flow channel, shown generally at 92*b*, and the second flow channel 92*b* is in fluid communication with second inner flow channel, shown generally at 94*b*, through the second aperture 28*b* of the second inner housing portion 14*b*. The second inner flow channel 94*b* is in fluid communication with the cavity 98 through the aperture 28*c*. The second inner flow channel 94*b* is also in fluid communication with the portion of the flow cavity 88*l* located on the second side 12*b* of the central housing 12. This results in flow paths between the second aperture 48*b* and the flow cavity 88*l*, and also between the second aperture 48*b* and the cavity 98.

The third aperture 48*c* of the second outer housing portion 14*d* is in fluid communication with a third flow channel, shown generally at 92*c*, and the third flow channel 92*c* is in fluid communication with a third inner flow channel, shown generally at 94*c*, through the aperture 28*d* of the second inner housing portion 14*b*. The third inner flow channel 94*c* is in fluid communication with a second flow cavity 96*b* of the central housing 12. This results in a flow path between the third aperture 48*c* and the second flow cavity 96*b*. The second flow cavity 96*b* is in fluid communication with the aperture 60*m* of the cylindrical cavity 54*b*.

The fourth aperture 48*d* of the second outer housing portion 14*d* is in fluid communication with a fourth flow channel, shown generally at 92*d*, and the fourth flow channel 92*d* is in fluid communication with both a fourth inner flow channel, shown generally at 94*d*, and a fifth inner flow channel shown generally at 94*e*. The fourth flow channel 92*d* is in fluid communication with the fourth inner flow channel 94*d* through the aperture 28*e* of the second inner housing portion 14*b*, and fourth flow channel 92*d* is in fluid communication with the fifth inner flow channel 94*e* through the aperture 28*f* of the second inner housing portion 14*b*. The fourth inner flow channel 94*d* is in fluid communication with a third flow cavity, shown generally at 96*c*, of the central housing 12, and the fifth inner flow channel 94*e* is in fluid communication with the portion of a fourth flow cavity, shown generally at 96*d*, located on the second side 12*b* of the central housing 12. This results in flow paths between the fourth aperture 48*d* and the flow cavity 96*c*, and also between the fourth aperture 48*d* and the flow cavity 96*d*.

The fifth aperture 48*e* of the second outer housing portion 14*d* is in fluid communication with a fifth flow channel, shown generally at 92*e*. The fifth flow channel 92*e* is in fluid communication with a sixth inner flow channel, shown generally at 94*f*, through the aperture 28*g* of the second inner housing portion 14*b*. The sixth inner flow channel 94*f* is in fluid communication with a fifth flow cavity, shown generally at 96*e*, of the central housing 12. This results in a flow path between the fifth aperture 48*e* and the fifth flow cavity 96*e*.

The sixth aperture 48*f* of the second outer housing portion 14*d* is in fluid communication with a sixth flow channel, shown generally at 92*f*. The sixth flow channel 92*f* is in fluid communication with a seventh inner flow channel, shown generally at 94*g*, through the aperture 28*h* of the second inner housing portion 14*b*. The sixth flow channel 92*f* is also in fluid communication with an eighth inner flow channel, shown generally at 94*h*, through the aperture 28*i* of the second inner housing portion 14*b*. The seventh inner flow channel 94*g* is in fluid communication with a sixth flow cavity, shown generally at 96*f*, of the central housing 12. The eighth inner flow channel 94*h* is in fluid communication with a seventh flow cavity, shown generally at 96*g*, of the central housing 12. This results in flow paths between the sixth aperture 48*f* and the sixth flow cavity 96*f*, and also between the sixth aperture 48*f* and the seventh flow cavity 96*g*.

As previously mentioned, there are several cavities 98,100,102,104 formed by a portion of the second inner housing 14*b* and the second outer housing portion 14*d*. The cavity 100 is in fluid communication with a ninth inner flow channel, shown generally at 94*i*, through the aperture 28*j* of the second inner housing portion 14*b*. The cavity 100 is also in fluid communication with a tenth inner flow channel, shown generally at 94*j*, through the aperture 28*k* of the second inner housing portion 14*b*. The ninth inner flow channel 94*i* is in fluid communication with an eighth flow cavity, shown generally at 96*h*, of the central housing 12, and the tenth inner flow channel 94*j* is in fluid communication with the portion of the flow cavity 88*c* located on the second side 12*b* of the central housing 12. This results in a flow path between the flow cavity 96*h* and the flow cavity 88*c*.

The cavity 102 is in fluid communication with an eleventh inner flow channel, shown generally at 94*k*, through the aperture 28*l* of the second inner housing portion 14*b*. The cavity 102 is also in fluid communication with a twelfth inner flow channel, shown generally at 94*l*, through the aperture 28*m* of the second inner housing portion 14*b*. The eleventh inner flow channel 94*k* is in fluid communication with a ninth flow cavity, shown generally at 96*i*, and the twelfth inner flow channel 94*l* is in fluid communication with the flow cavity 88*e*, of the central housing 12. This results in a flow path between the fifth flow cavity 88*e* and the ninth flow cavity 96*i*.

The cavity 104 is in fluid communication with a thirteenth inner flow channel, shown generally at 94*m*, through the aperture 28*n* of the second inner housing portion 14*b*. The thirteenth inner flow channel 94*m* is in fluid communication with a tenth flow cavity, shown generally at 96*j*, of the central housing 12.

There are several cavities of the second side 12*b* of the central housing 12 which are unused, or fluid does not pass through to provide fluid pressure. Several areas of the central wall 26 of the second inner housing portion 14*b* function as backing areas, or backing plates, for one of the cavities of the second side 12*b* of the central housing 12. More specifically, there are several cavities, shown generally at 96*m*,96*n*,96*o*,96*p*,96*q* respectively, which are part of the central housing 12, where no fluid passes through these cavities. There is also a cavity, shown generally at 96*r*, through which no fluid passes, but is in fluid communication with the first rotor 64*a* through the aperture 58*e*. The second inner housing portion 14*b* includes a three backing plates C1,C2,C3 which enclose the portions of the flow cavity 88*d* located on the second side 12*b* of the central housing 12. The second inner housing portion also includes two backing plates C4,C5 which enclose the portions of the flow cavity 96*k* located on the second side 12*b* of the central housing 12. The second inner housing portion 14*b* also includes a sixth backing plate C6 which encloses the flow cavity 96*l*. The backing plates C7,C8,C9,C10,C11 enclose the cavities 96*m*, 96*n*,96*o*,96*p*,96*q* through which no fluid passes, and the backing plate C12 encloses the cavity 96r which is in fluid communication with the first rotor 64a through the aperture 58e.

Figure 14:
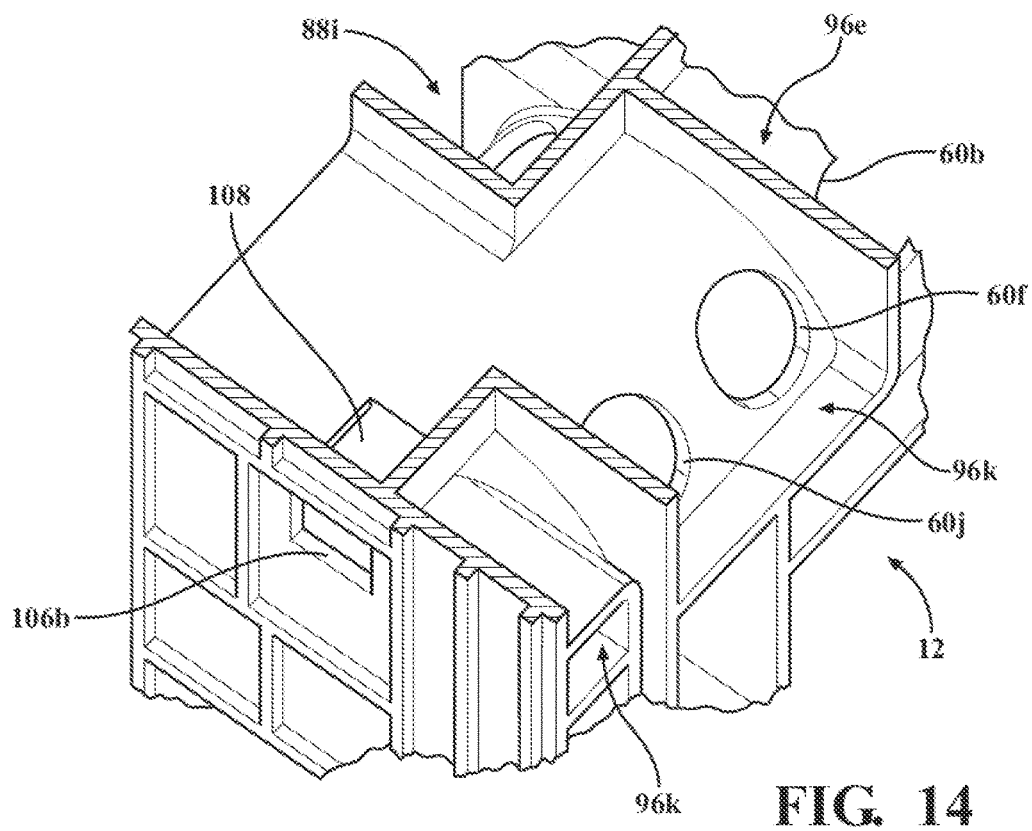
FIG. 14 is a sectional view taken along line 14-14 of FIG. 7A.
Figure 15A:
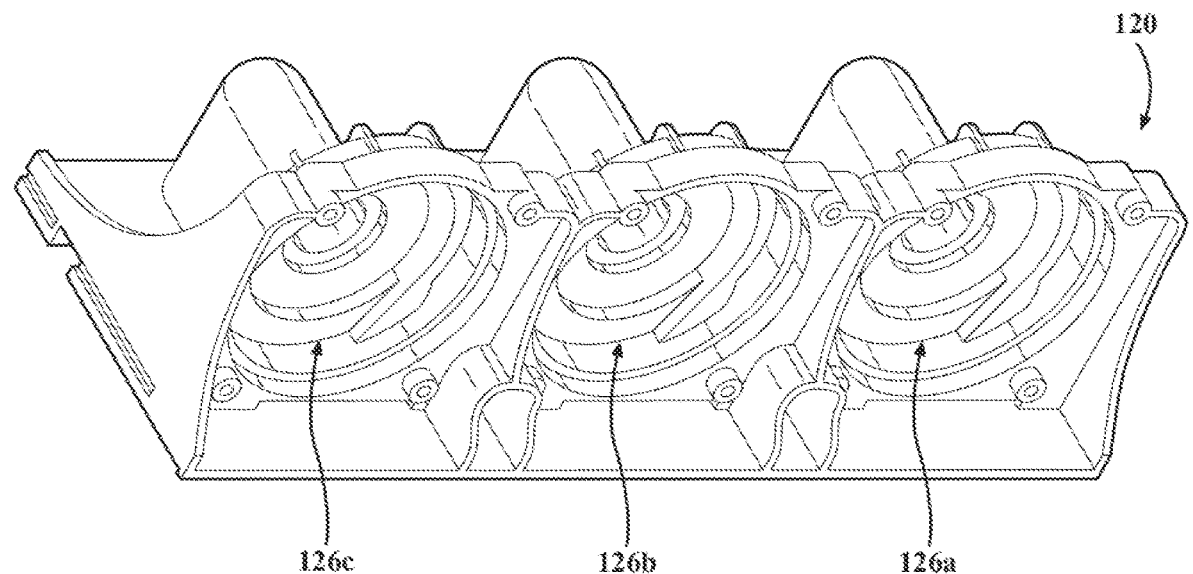
FIG. 15A is a first perspective view of a pump housing, which is part of a multi-port thermal module, according to embodiments of the present invention.
Figure 15B:
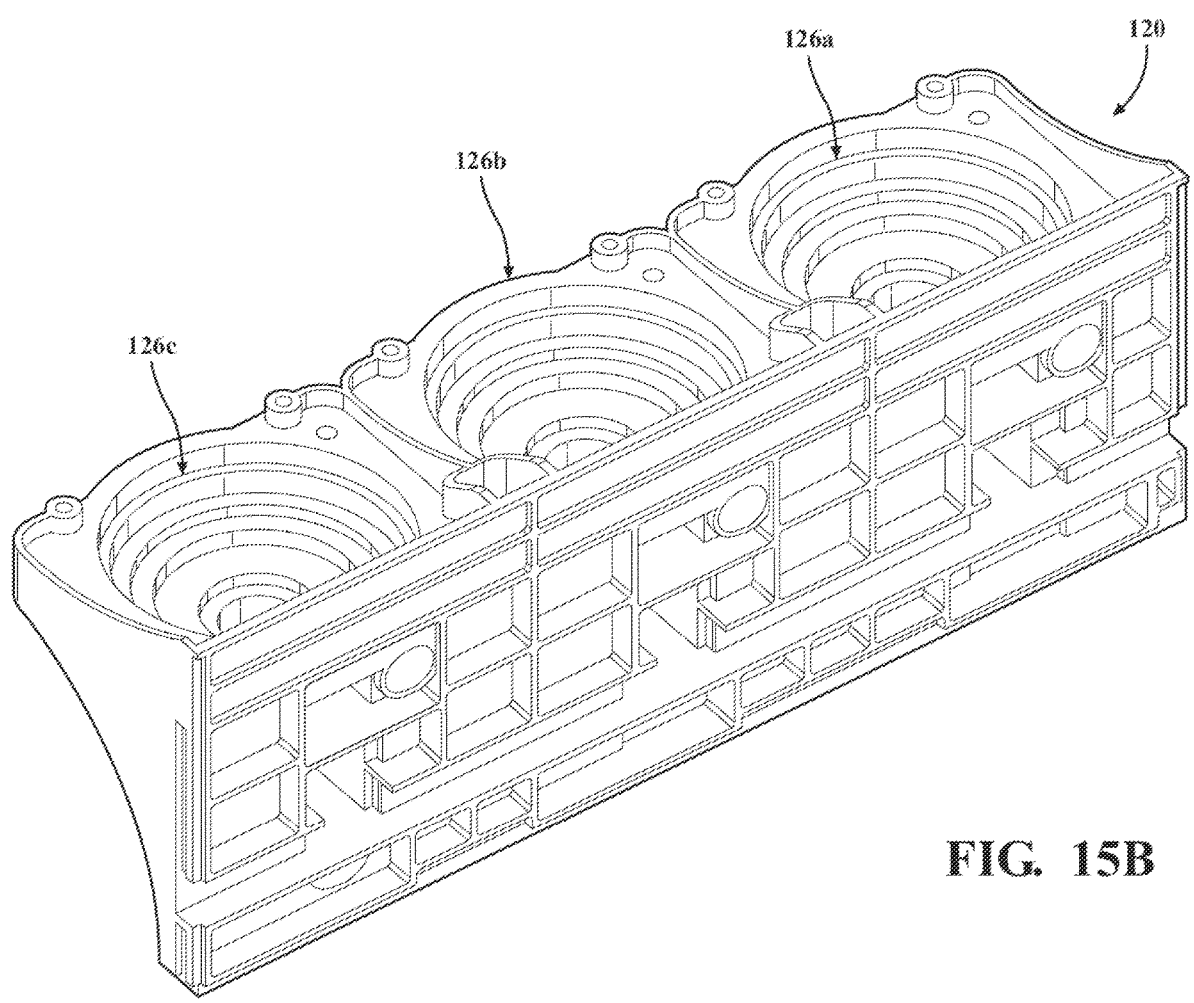
FIG. 15B is a second perspective view of a pump housing which is part of a multi-port thermal module, according to embodiments of the present invention.
Figure 15C:
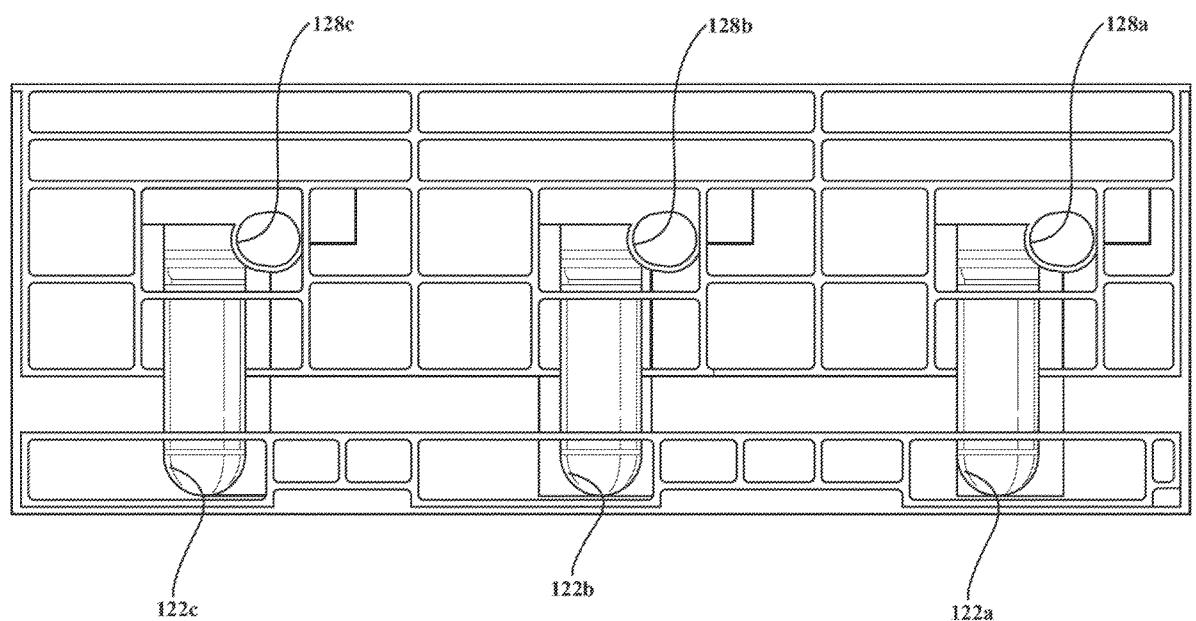
FIG. 15C is a bottom view of a pump housing which is part of a multi-port thermal module, according to embodiments of the present invention.
Figure 15D:
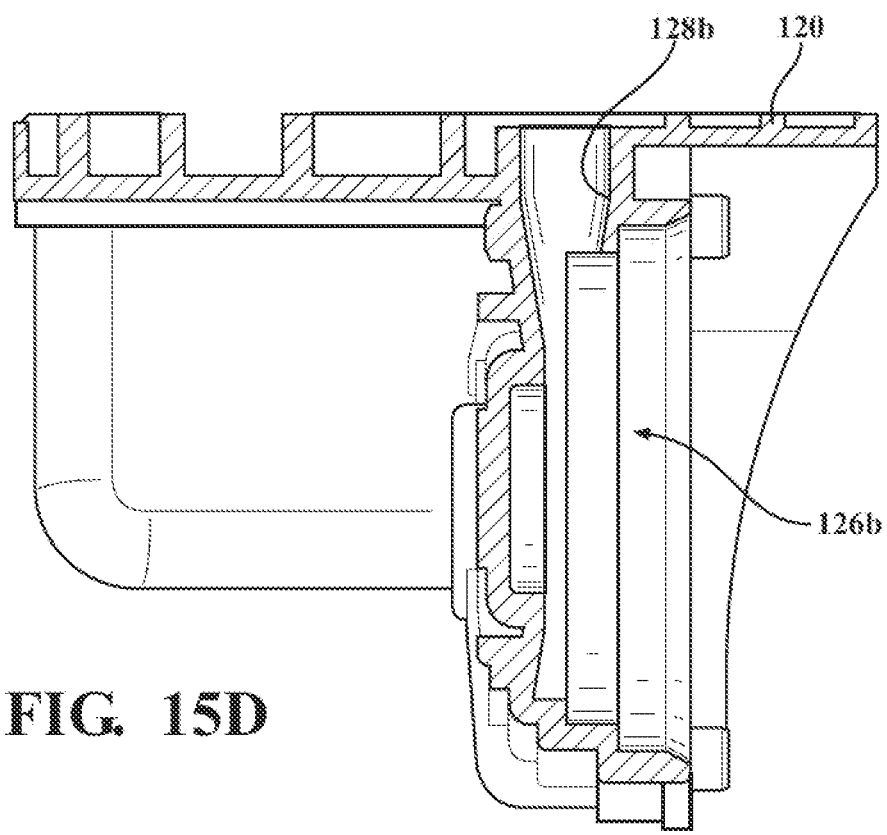
FIG. 15D is a sectional view taken along lines 15D-15D of FIG. 15A.
Figure 15E:
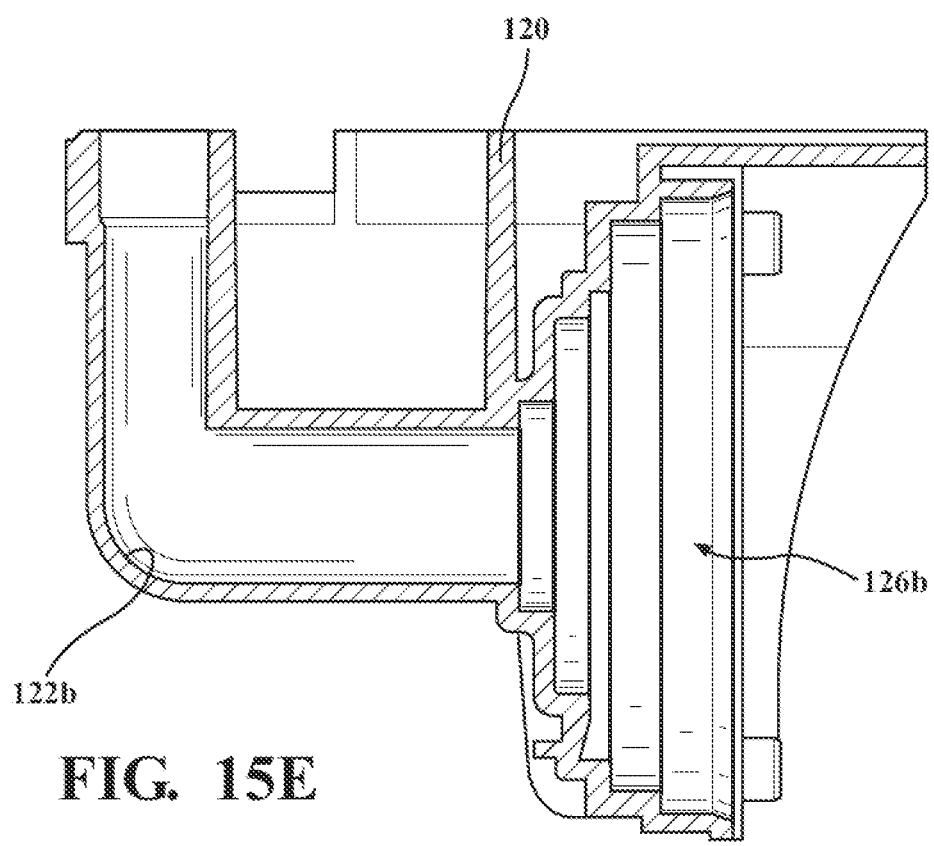
FIG. 15E is a sectional view taken along lines 15E-15E of FIG. 15A.
Figure 16A:
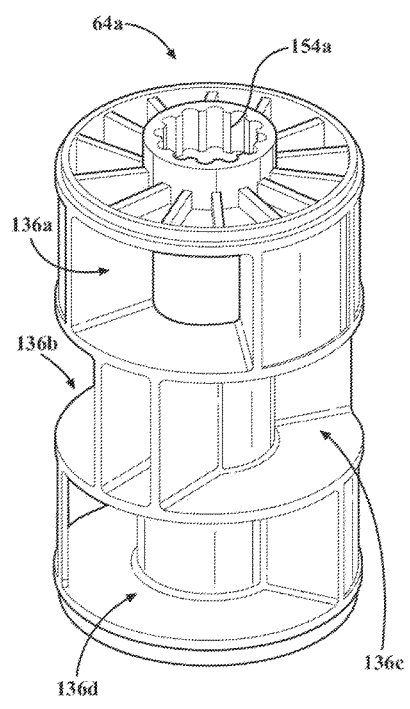
FIG. 16A is a first perspective view of a first rotor, which is part of a multi-port thermal module, according to embodiments of the present invention.
Figure 16B:
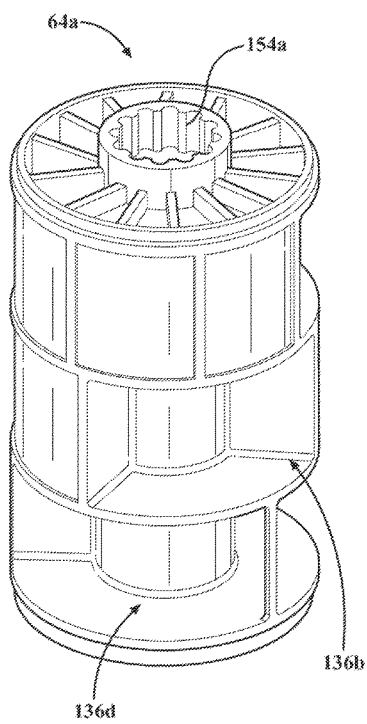
FIG. 16B is a second perspective view of a first rotor, which is part of a multi-port thermal module, according to embodiments of the present invention.
Figure 16C:
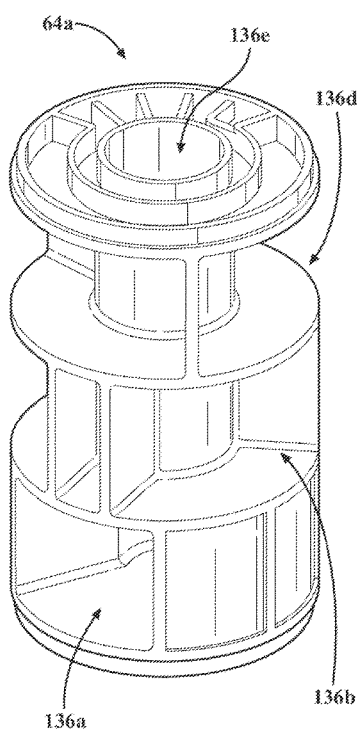
FIG. 16C is a third perspective view of a first rotor, which is part of a multi-port thermal module, according to embodiments of the present invention.
Figures 17A, 17B, 17C:
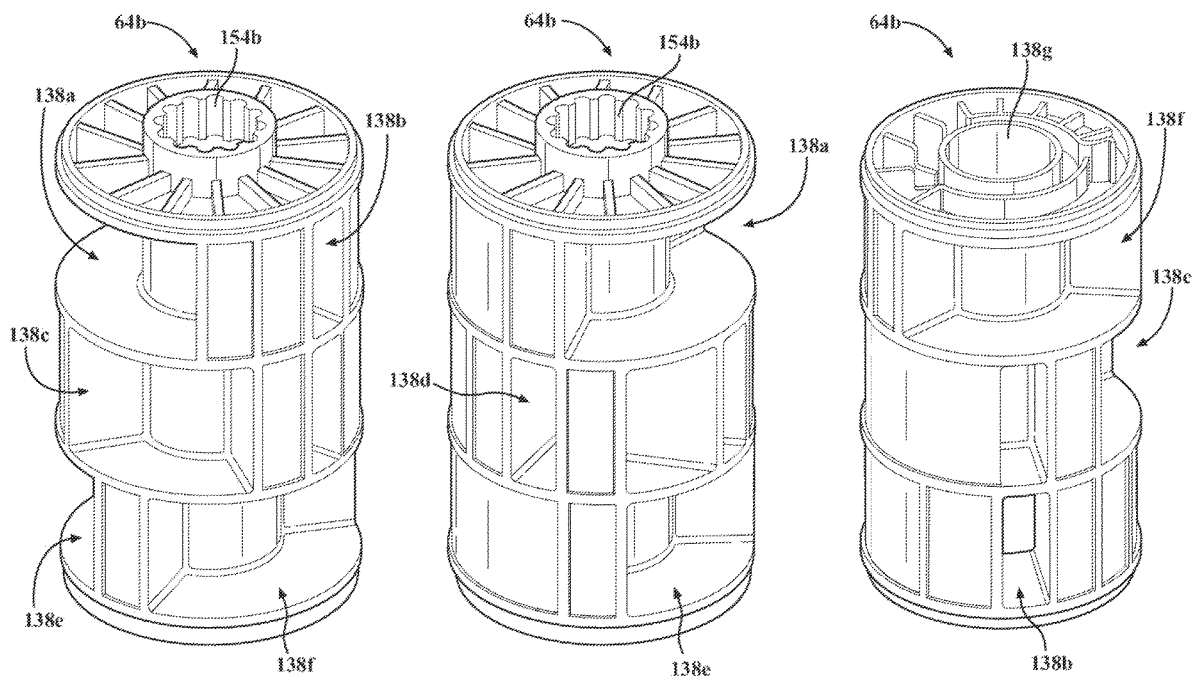
FIG. 17A is a first perspective view of a second rotor, which is part of a multi-port thermal module, according to embodiments of the present invention.
FIG. 17B is a second perspective view of a second rotor, which is part of a multi-port thermal module, according to embodiments of the present invention.
FIG. 17C is a third perspective view of a second rotor, which is part of a multi-port thermal module, according to embodiments of the present invention.
Figure 18A:
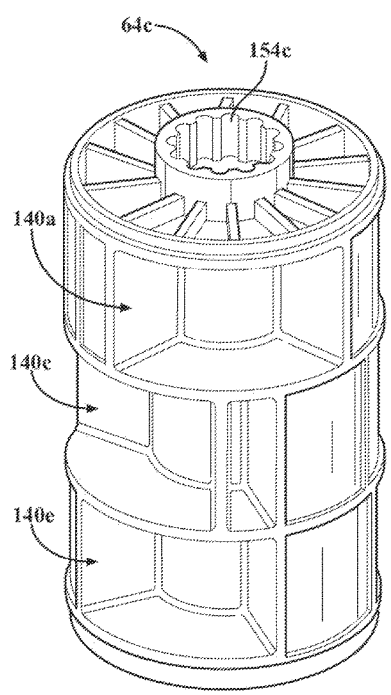
FIG. 18A is a first perspective view of a third rotor, which is part of a multi-port thermal module, according to embodiments of the present invention.
Figure 18B:
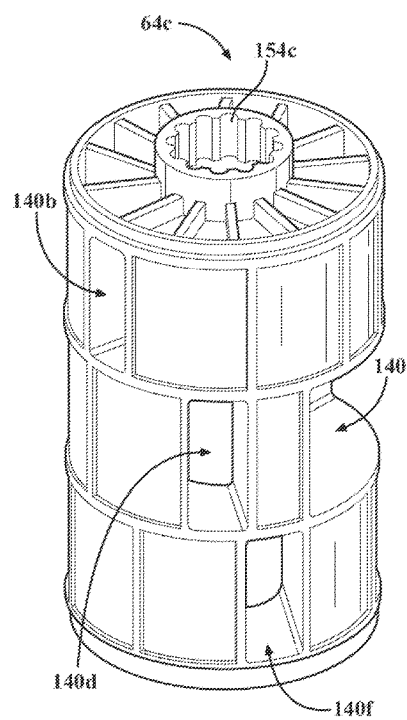
FIG. 18B is a second perspective view of a third rotor, which is part of a multi-port thermal module, according to embodiments of the present invention.
Figure 18C:
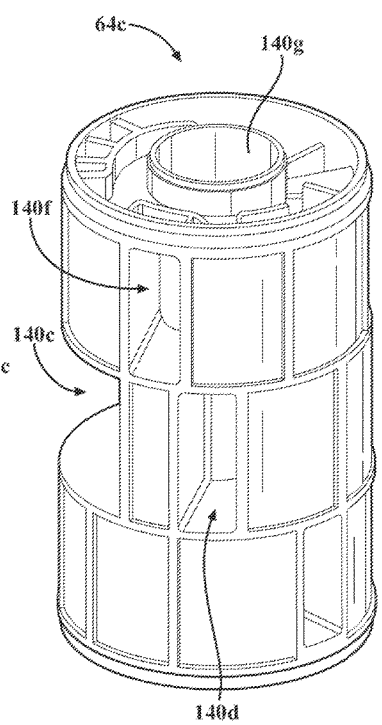
FIG. 18C is a third perspective view of a third rotor, which is part of a multi-port thermal module, according to embodiments of the present invention.

Referring to FIGS. 7A-8B and 14, as mentioned above, there are three apertures 106a,106b,106c integrally formed as part of the exterior circumferential wall 52. More specifically, the first aperture 106a is in fluid communication with the flow cavity 96j, and the flow cavity 96j is in fluid communication with one of the apertures 58i of the cylindrical cavity 54a. The second aperture 106b is in fluid communication with a channel 108 integrally formed as part of the central housing 12. The channel 108 is in fluid communication with the flow cavity 96k, as shown in FIG. 14, of the central housing 12. The flow cavity 96k is also in fluid communication with two of the apertures 60f,60j of the cylindrical cavity 54b. The third aperture 106c is in fluid communication with the flow cavity 96l, and the flow cavity 96l is in fluid communication with three of the apertures 62b,62f,62j of the cylindrical cavity 54c.

Referring to FIGS. 15A-15E, attached to the central housing 12, the first inner housing portion 14a, and the first outer housing portion 14c is a pump housing, shown generally at 120. Three channels 122a,122b,122c are integrally formed as part of the pump housing 120. The first channel 122a is in fluid communication with the aperture 38l, the second channel 122b is in fluid communication with the aperture 38m, and the third channel 122c is in fluid communication with the aperture 38n.

The pump housing 120 may be connected to the first inner housing portion 14a, the first outer housing portion 14c, and the central housing 12 using any suitable process, such as, but not limited to, hot gas welding, infrared, or hot plate welding, or any other suitable welding process. In other embodiments, other processes, such as material deformation processes (other than various types of welding), may be used to connect the pump housing 120 to the first inner housing portion 14a, the first outer housing portion 14c, and the central housing 12.

The first channel 122a is also in fluid communication with a first pump 124a, the second channel 122b is in fluid communication with a second pump 124b, and the third channel 122c is in fluid communication with a third pump 124c. The pump housing 120 also includes a first cavity, shown generally at 126a, a second cavity, shown generally at 126b, a third cavity, shown generally at 126c. The first pump 124a is connected to the pump housing 120 such that the first pump 124a is partially disposed in the first cavity 126a, the second pump 124b is connected to the pump housing 120 such that the second pump 124b is partially disposed in the second cavity 126b, and the third pump 124c is connected to the pump housing 120 such that the third pump 124c is partially disposed in the third cavity 126c.

There are also three additional channels 128a,128b,128c integrally formed as part of the pump housing 120. The first pump 124a is also in fluid communication with the channel 128a, the second pump 124b is also in fluid communication with the channel 128b, and the third pump 124c is also in fluid communication with the channel 128c.

The channel 128a is in fluid communication with the aperture 106c, the channel 128b is in fluid communication with the aperture 106b, and the channel 128c is in fluid communication with the aperture 106a.

Referring again to FIGS. 16A-18C, as previously mentioned, the multi-port thermal module 10 also includes the first rotor 64a, the second rotor 64b, and the third rotor 64c. There are several channels integrally formed as part of the first rotor 64a. More specifically, there is a first channel, shown generally at 136a, a second channel, shown generally at 136b, a third channel, shown generally at 136c, a fourth channel, shown generally at 136d, and a fifth channel, shown generally at 136e. The fifth channel 136e extends through the center of the rotor 64a, and is in fluid communication with the first channel 136a. The fifth channel 136e is also in fluid communication with the flow cavity 96a through the aperture 58m, regardless of the orientation of the rotor 64a.

There are several channels integrally formed as part of the second rotor 64b. More specifically, there is a first channel, shown generally at 138a, a second channel, shown generally at 138b, a third channel, shown generally at 138c, a fourth channel, shown generally at 138d, a fifth channel, shown generally at 138e, a sixth channel, shown generally at 138f, and a seventh channel, shown generally at 138g. The seventh channel 138g extends through the center of the rotor 64b, and is in fluid communication with the second channel 138b and the fourth channel 138d. The seventh channel 138g is in also in fluid communication with the flow cavity 96b through the aperture 60m, regardless of the orientation of the rotor 64b.

There are also several channels integrally formed as part of the third rotor 64c. More specifically, there is a first channel, shown generally at 140a, a second channel, shown generally at 140b, a third channel, shown generally at 140c, a fourth channel, shown generally at 140d, a fifth channel, shown generally at 140e, a sixth channel, shown generally at 140f, and a seventh channel, shown generally at 140g. The seventh channel 140g extends through the center of the rotor 64c, and is in fluid communication with the second channel 140b, the fourth channel 140d, and the sixth channel 140f. The seventh flow channel 140g is also in fluid communication with the flow cavity 88a through the aperture 62m, regardless of the orientation of the rotor 64c.

Although it has been described above that the pump housing 120 is connected to the first inner housing portion 14a, the first outer housing portion 14c, and the central housing 12, it is within the scope of the invention that in other embodiments, in addition to the central housing 12, the pump housing 120 may be connected to and in fluid communication with one or more of the first inner housing portion 14a, the first outer housing portion 14c, the second inner housing portion 14b, or the second outer housing portion 14d, such that any of the channels 122a,122b,122c may be in fluid communication with the flow channels or the inner flow channels (in addition to, or instead of the flow channels 84i,84j,84k). In other embodiments, the pump housing 120 also may have additional channels, and the connection of the pump housing 120 may be such that the pumps 124a,124b,124c are operable for transferring fluid from one or more of the various flow channels or inner flow channels of the housing portions 14a,14b,14c,14d mentioned above to a corresponding one of the rotors 64a,64b, 64c. Additionally, the pump housing 120 may be connected to one or more of the first inner housing portion 14a, the second inner housing portion 14b, the first outer housing portion 14c, the second outer housing portion 14d, and the central housing 12 using any of the welding or material deformation processes previously described.

Figure 19A:
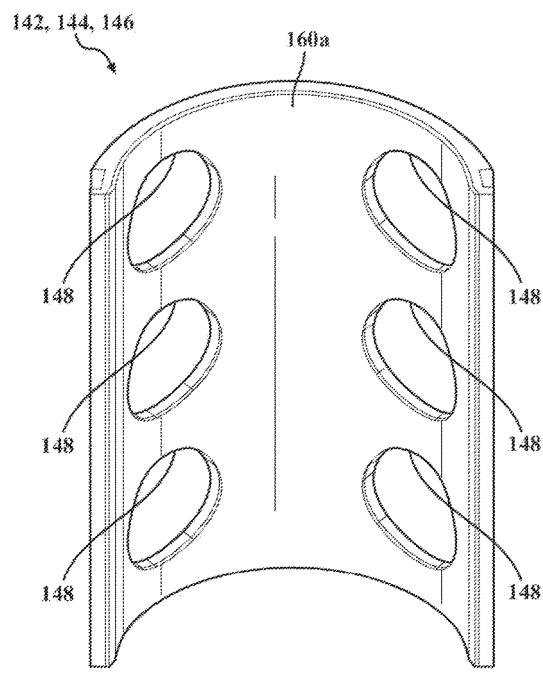
FIG. 19A is a first perspective view of a sleeve, which is part of a multi-port thermal module, according to embodiments of the present invention.
Figure 19B:
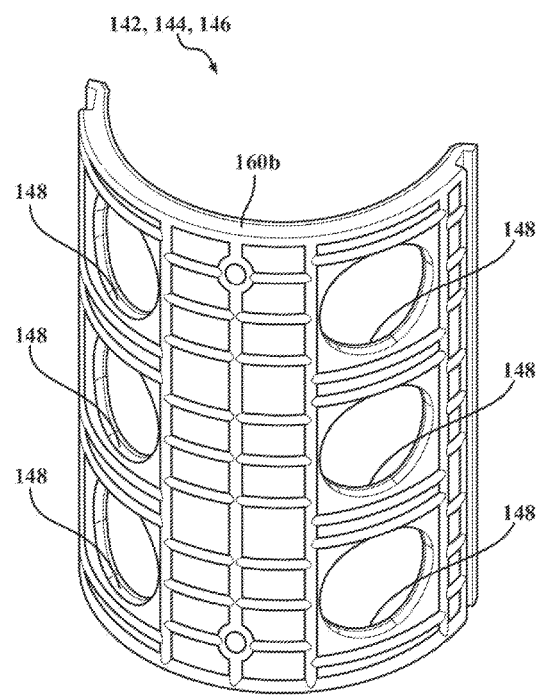
FIG. 19B is a second perspective view of a sleeve, which is part of a multi-port thermal module, according to embodiments of the present invention.
Figure 19C:
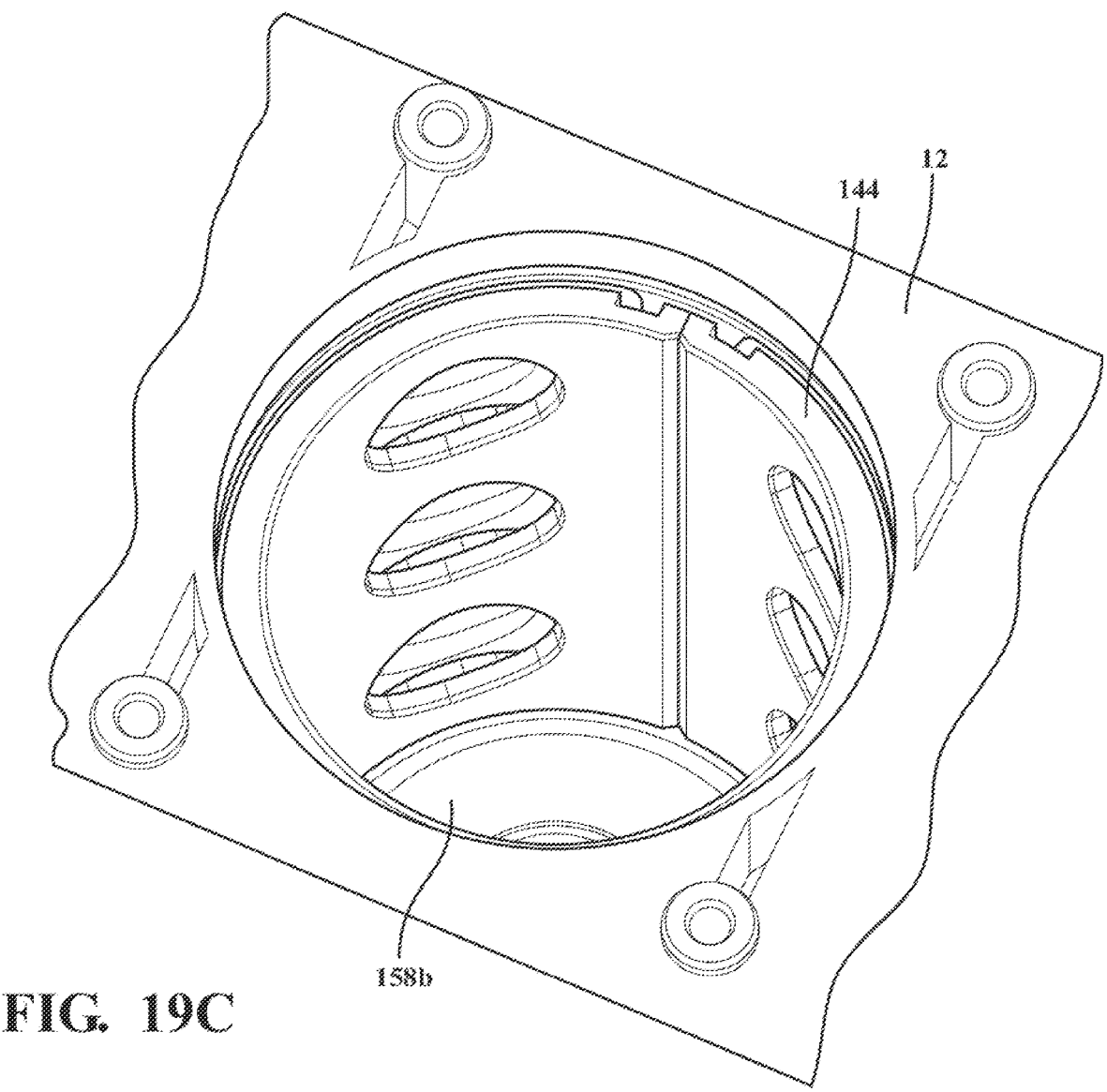
FIG. 19C is a perspective view of a portion of a central housing, with a sleeve disposed in a cylindrical cavity of the central housing, according to embodiments of the present invention.
Figure 20:
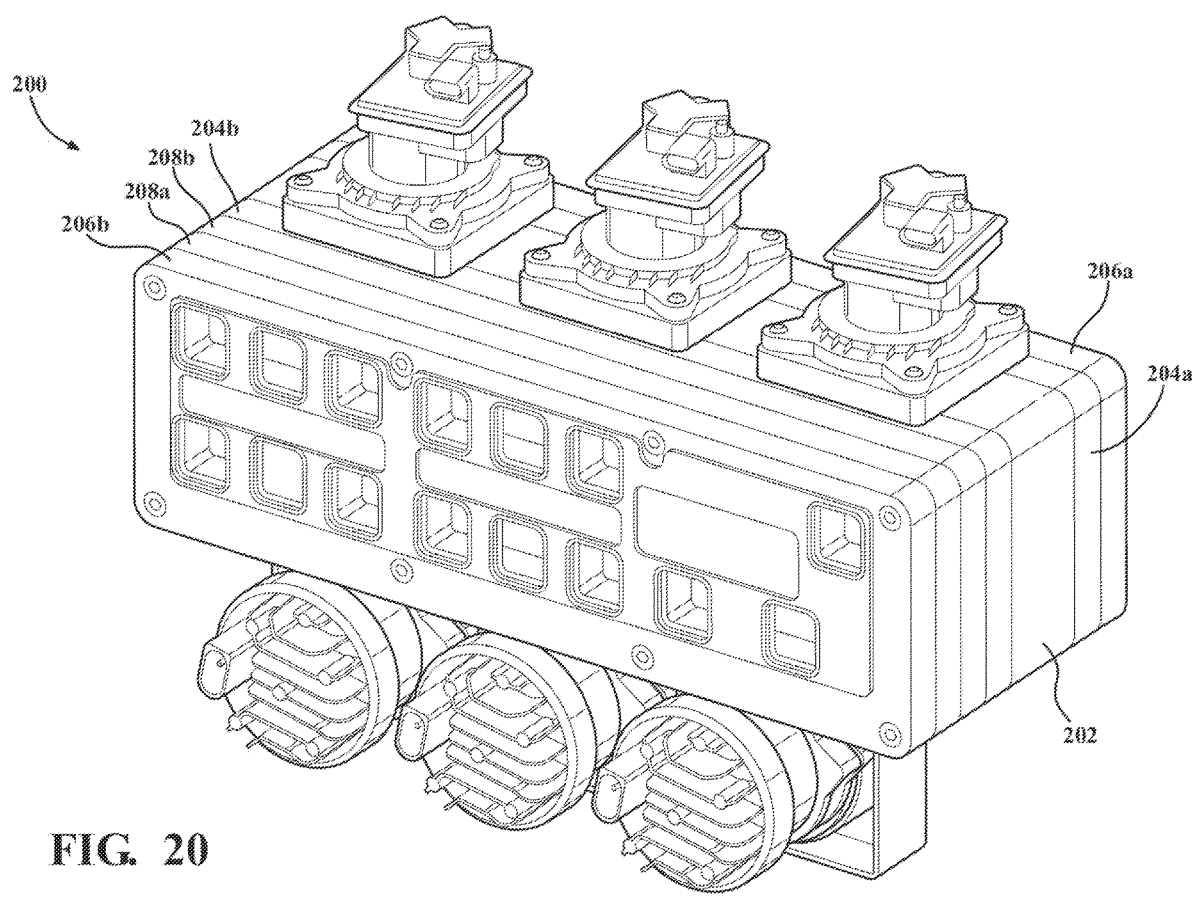
FIG. 20 is first perspective view of a second embodiment of a multi-port thermal module, according to embodiments of the present invention.
Figure 21:
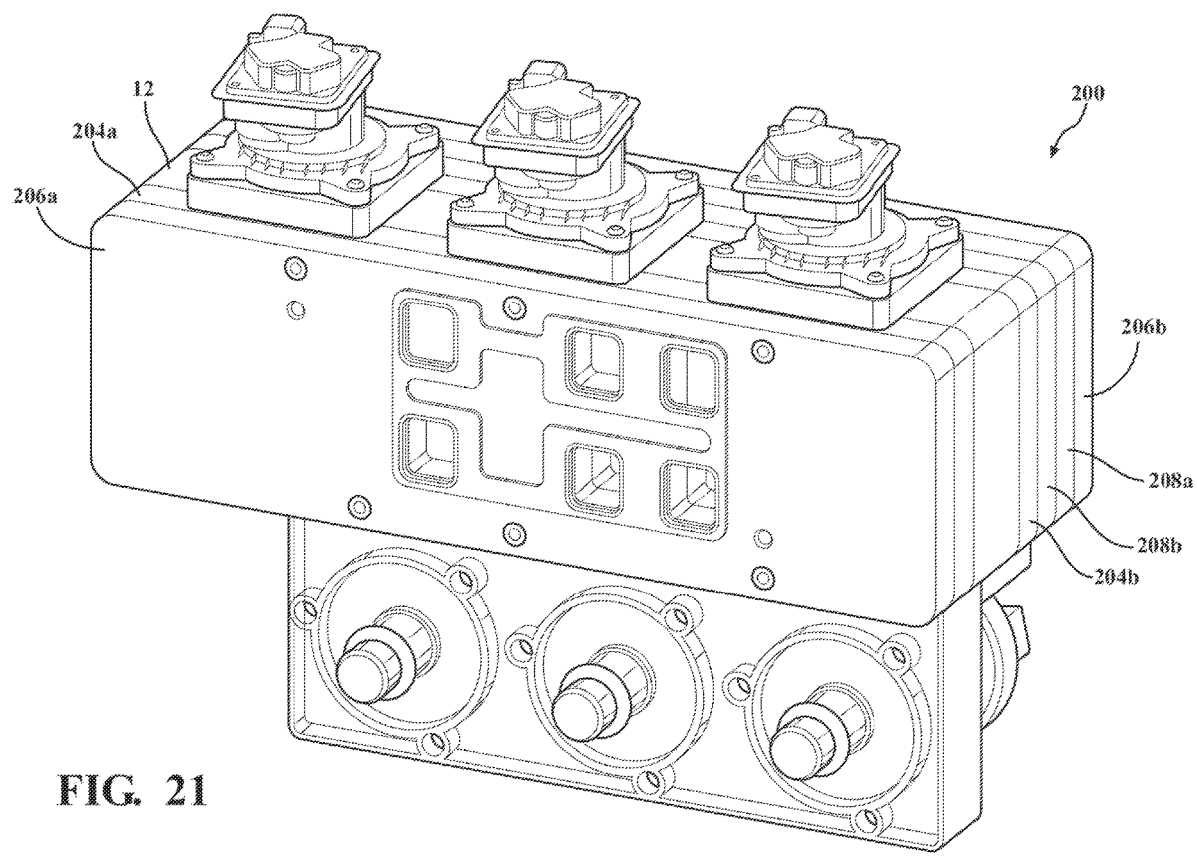
FIG. 21 is a second perspective view of a second embodiment of a multi-port thermal module, according to embodiments of the present invention.
Figure 22:
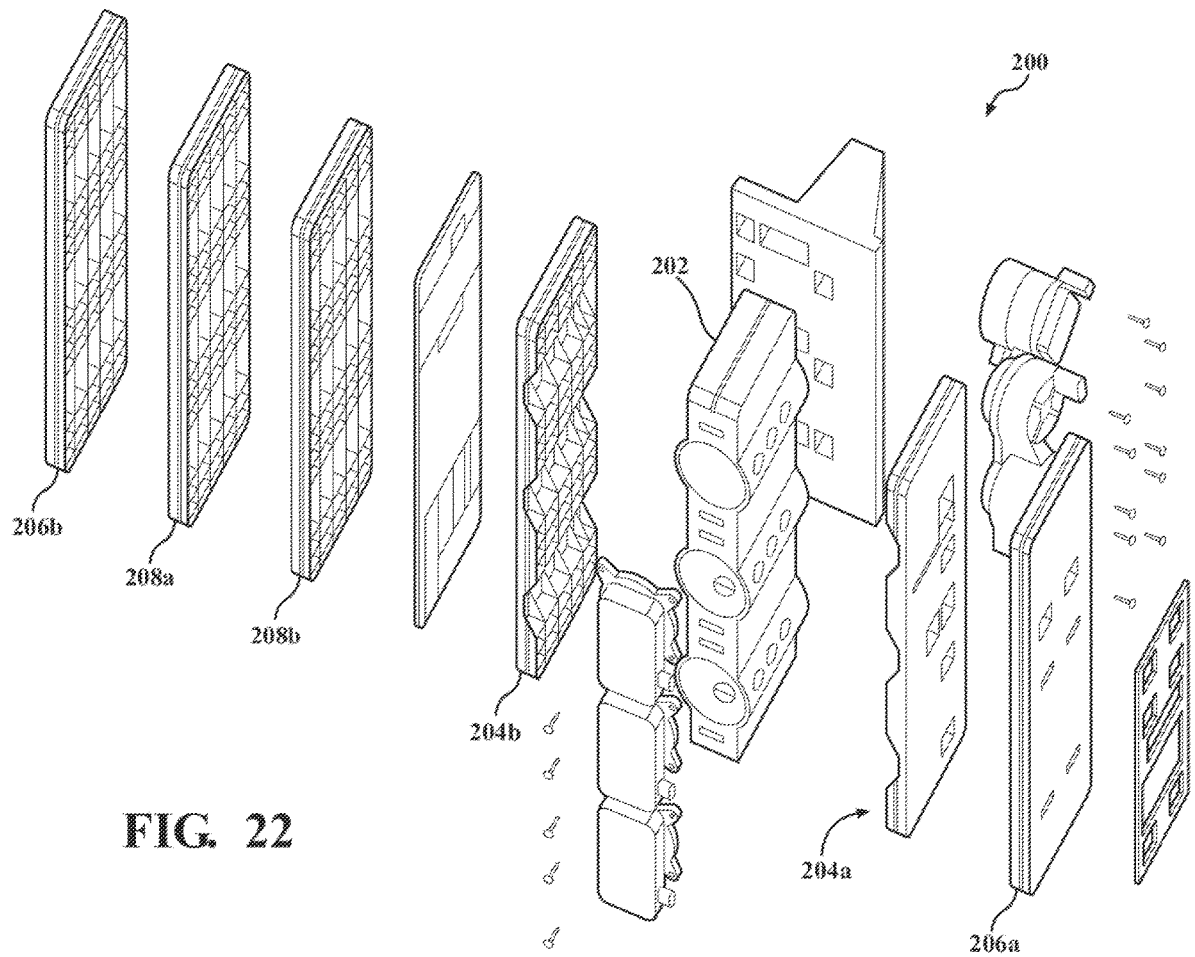
FIG. 22 is an exploded view of a second embodiment of a multi-port thermal module, according to embodiments of the present invention.
Figure 23A:
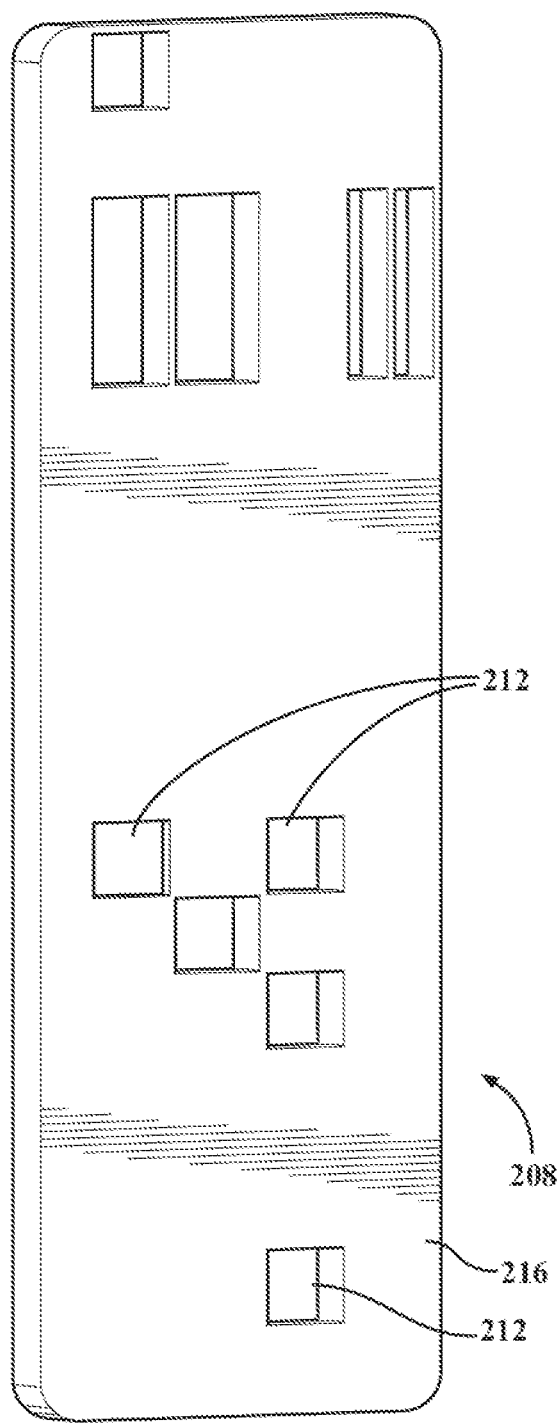
FIG. 23A is first perspective view of an intermediate housing used as part of a second embodiment of a multi-port thermal module, according to embodiments of the present invention.
Figure 23B:
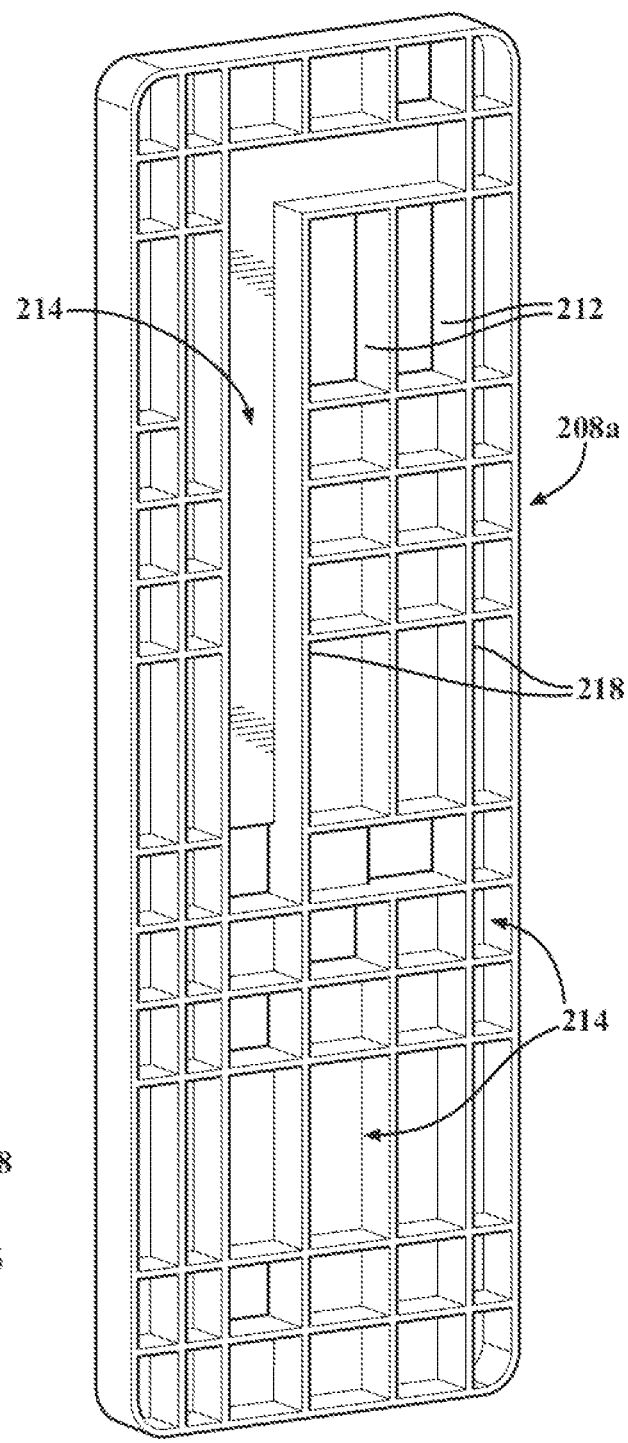
FIG. 23B is second perspective view of an intermediate housing used as part of a second embodiment of a multi-port thermal module, according to embodiments of the present invention.

Referring to FIGS. 3-5 and 19A-19C, surrounding each of the rotors 64a,64b,64c is a corresponding sleeve. A first sleeve 142 surrounds the first rotor 64a, a second sleeve 144 surrounds the second rotor 64b, and a third sleeve 146 surrounds the third rotor 64c. The sleeves 142,144,146 are all substantially similar in shape and construction, and therefore only one is shown in FIGS. 19A-19C. Each sleeve 142,144,146 has two halves 160a,160b, which together circumscribe each corresponding rotor 64a,64b,64c. Each sleeve 142,144,146 also has apertures, several of which are referenced at 148. Each aperture 148 of the first sleeve 142 is aligned with one of the apertures 58a-58l formed as part of the side wall 56a of the first cylindrical cavity 54a, each aperture 148 of the second sleeve 144 is aligned with one of the apertures 60a-60l formed as part of the side wall 56b of the second cylindrical cavity 54b, and each aperture 148 of the third sleeve 146 is aligned with one of the apertures 62a-62l formed as part of the side wall 56c of the second cylindrical cavity 54c.

Each sleeve 142,144,146 is in contact with a corresponding one of the lower walls 158a,158b,158c, respectively, and also extends the entire height of the corresponding cavity 54a,54b,54c, an example of which is shown in FIG. 19C. The sleeves 142,144,146 function as a sealing element to prevent any fluid flowing through the channels of the rotors 64a,64b,64c from leaking around the sleeves 142,144,146 into undesired areas of the central housing 12. The exterior surface of each sleeve 142,144,146 is supported by a corresponding one of the sidewalls 56a,56b,56c of the cavities 54a,54b,54c, and the interior surface of each sleeve 54a, 54b,54c is supported by one of the rotors 64a,64b,64c.

As previously mentioned, each valve assembly includes at least one valve, or rotor, which is controlled by a corresponding actuator assembly. Referring to FIGS. 1, 3-5, 16A-16B, 17A-17B, and 18A-18B, each of the rotors 64a, 64b,64c also includes a set of internal gear teeth 154a,154b, 154c. The gear teeth 154a,154b,154c are in mesh with the gear teeth (not shown) of a corresponding actuator assembly. There are three actuator assemblies. A first actuator assembly, shown generally at 156a, a second actuator assembly, shown generally at 156b, and a third actuator assembly, shown generally at 156c, where the actuator assemblies 156a,156b,156c are connected to the exterior circumferential wall 52 of the central housing 12, on the opposite side of the central housing 12 as the pump housing 120. The first actuator assembly 156a rotates the first rotor 64a, the second actuator assembly 156b rotates the second rotor 64b, and the third actuator assembly 156c rotates the third rotor 64c.

Referring to FIGS. 7A-8B and 16A-16C, the first rotor 64a a may be rotated to one of multiple positions. In a non-limiting example, the rotor 64a may be rotated such that the first channel 136a is in fluid communication with one or more of the flow cavity 88d through the apertures 58a,58b, the flow cavity 88h through the aperture 58d, and the flow cavity 88i through the aperture 58c. The rotor 64a may also be rotated such that the second channel 136b or the third channel 136c may be placed in fluid communication with the ninth flow cavity 96i through the aperture 58f, the flow cavity 88e through the aperture 58h, the third flow cavity 88c through the aperture 58g, or the flow cavity 96r through the aperture 58e. The second channel 136b or the third channel 136c may also be placed in fluid communication with any two of the cavities which are adjacent to one another, such as the flow cavity 88e and the flow cavity 88c. The fourth channel 136d is shaped such that the rotor 64a may also be rotated to place the fourth channel 136d in fluid communication with the flow cavity 88l through the aperture 58k, the flow cavity 96j through the aperture 58i, the flow cavity 88q through the aperture 58l, or the flow cavity 96c through the aperture 58j. More specifically, the fourth channel 136d is in fluid communication with three of the flow cavities 88l,96c,96j,88q at all times.

Referring to FIGS. 7A-8B and 17A-17C, the second rotor 64b may also be rotated to one of multiple positions. In a non-limiting example, the rotor 64b may be rotated such that the first channel 138a or the second channel 138b are placed in fluid communication with one of the flow cavity 88d through the aperture 60a, the flow cavity 96e through the aperture 60b, the flow cavity 88f through the aperture 60c, and the flow cavity 88g through the aperture 60d. The first channel 138a is shaped such that the first channel 138a may also be placed in fluid communication with any two of the cavities which are adjacent to one another, such as the flow cavity 88d and the flow cavity 96e. The rotor 64b may also be rotated such that the third channel 138c or the fourth channel 138d may be placed in fluid communication with the flow cavity 88d through the aperture 60e, the flow cavity 96k through the aperture 60f, or the flow cavity 88i through both the apertures 60g,60h. The third channel 138c is shaped such that the third channel 138c may also be placed in fluid communication with any two of the cavities which are adjacent to one another, such as the flow cavity 96k and the flow cavity 88i. The second rotor 64b may also be rotated such that the fifth channel 138e or the sixth channel 138f may be placed in fluid communication with the flow cavity 96f through the aperture 60i, the flow cavity 96k through the aperture 60j, the flow cavity 88i through the aperture 60k, or through the flow cavity 88b through the aperture 60l. The fifth channel 138e or the sixth channel 138f may also be placed in fluid communication with any two of the cavities which are adjacent to one another, such as the flow cavity 88b and the flow cavity 88i.

Referring to FIGS. 7A-8B and 18A-18C, the third rotor 64c may also be rotated to one of multiple positions. In a non-limiting example, the rotor 64c may be rotated such that the first channel 140a or the second channel 140b are placed in fluid communication with one of the flow cavity 96g through the aperture 62a, the flow cavity 96l through the aperture 62b, the flow cavity 88j through the aperture 62c, and the flow cavity 88d through the aperture 62d. The first channel 140a may also be placed in fluid communication with any two of the cavities which are adjacent to one another, such as the flow cavity 96g and the flow cavity 96l. The rotor 64b may be rotated such that the third channel 140c or the fourth channel 140d may be placed in fluid communication with the flow cavity 96h through the aperture 62e, the flow cavity 96l through the aperture 62f, the flow cavity 88k through the aperture 62g, the flow cavity 88d through the aperture 62h. The third channel 140c may also be placed in fluid communication with any two of the cavities which are adjacent to one another, such as the flow cavity 96h and the flow cavity 96l. The rotor 64c may also be rotated such that the fifth channel 140e or the sixth channel 140f may be placed in fluid communication with the flow cavity 88d through the aperture 62i, the flow cavity 96l through the aperture 62j, the flow cavity 96d through the aperture 62k, and the flow cavity 88d through the aperture 62l. The channel 140e may also be placed in fluid communication with any two of the cavities which are adjacent to one another, such as the flow cavity 96l and the flow cavity 88d.

Referring to FIGS. 7A-8B and 16A-18C, in a specific non-limiting example, the first rotor 64a is placed in an orientation where the rotor 64a is rotated such that the first channel 136a is in fluid communication with the flow cavity 88h, the second channel 136b is in fluid communication with the flow cavity 96r, the third channel 136c is in fluid communication with the flow cavity 88c and flow cavity 88e, and the fourth channel 136d is in fluid communication with the flow cavities 88q,96c,96j.

In the same specific non-limiting example, the second rotor 64b is rotated such that the first channel 138a is in fluid communication with the flow cavity 96e and the flow cavity 88f, the second channel 138b is in fluid communication with the flow cavity 88d, the third channel 138c is in fluid communication with the flow cavity 96k, the fourth channel 138d is in not in fluid communication with any of the flow cavities, the fifth channel 138e is in fluid communication with the channel 88i, and the sixth channel 138f is in fluid communication with the cavities 96f,96k.

In still the same specific non-limiting example, the third rotor 64c is rotated such that the first channel 140a is in fluid communication with the flow cavities 88d,96g, the second channel 140b is not in fluid communication with any of the flow cavities, the third channel 140c is in fluid communication with the flow cavity 96h, the fourth flow channel 140d is in fluid communication with the flow cavity 96l, the fifth flow channel 140e is in fluid communication with the flow cavity 88d, and the six flow channel 140f is in fluid communication with the flow cavity 96l.

The rotors 64a,64b,64c may be rotated to any one of several orientations to provide fluid communication between various combinations of the first plurality of flow cavities 88a-88l and the second plurality of flow cavities 96a-96l, such that fluid communication between the apertures 38a-38k of the first outer housing portion 14c and the apertures 48a,48b,48c,48d,48e,48f of the second outer housing portion 14d may be achieved by way of the various flow paths described above. Rotation of the rotors 64a,64b,64c also facilitates the directing of fluid flowing from the pumps 124a,124b,124c to one or more of the first plurality of flow cavities 88a-88l and the second plurality of flow cavities 96a-96l, such that fluid is directed to one or more of the apertures 38a-38k of the first outer housing portion 14c in combination with one or more of the apertures 48a,48b,48c, 48d,48e,48f of the second outer housing portion 14d by way of the various flow paths described above.

Figure 2:
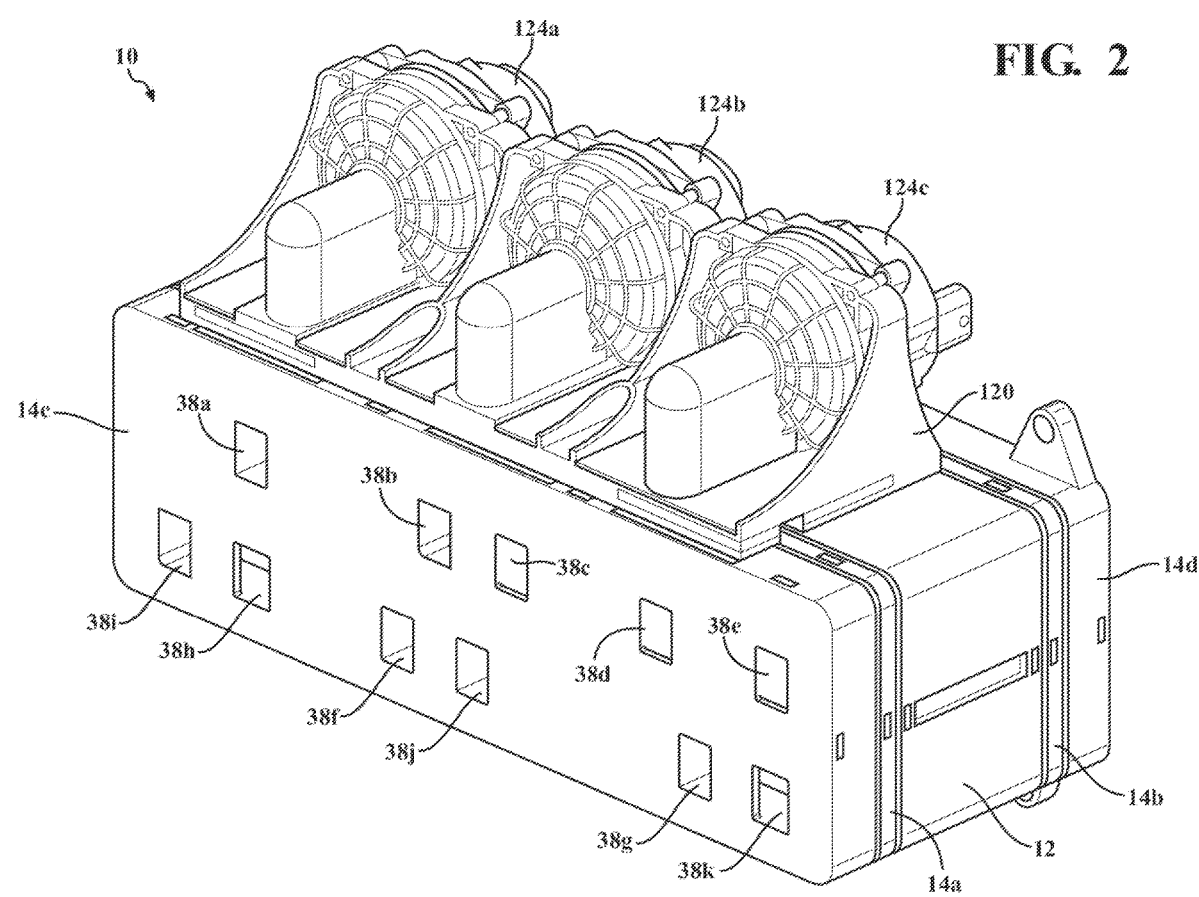
FIG. 2 is a second perspective view of a multi-port thermal module, according to embodiments of the present invention.
Figure 3:
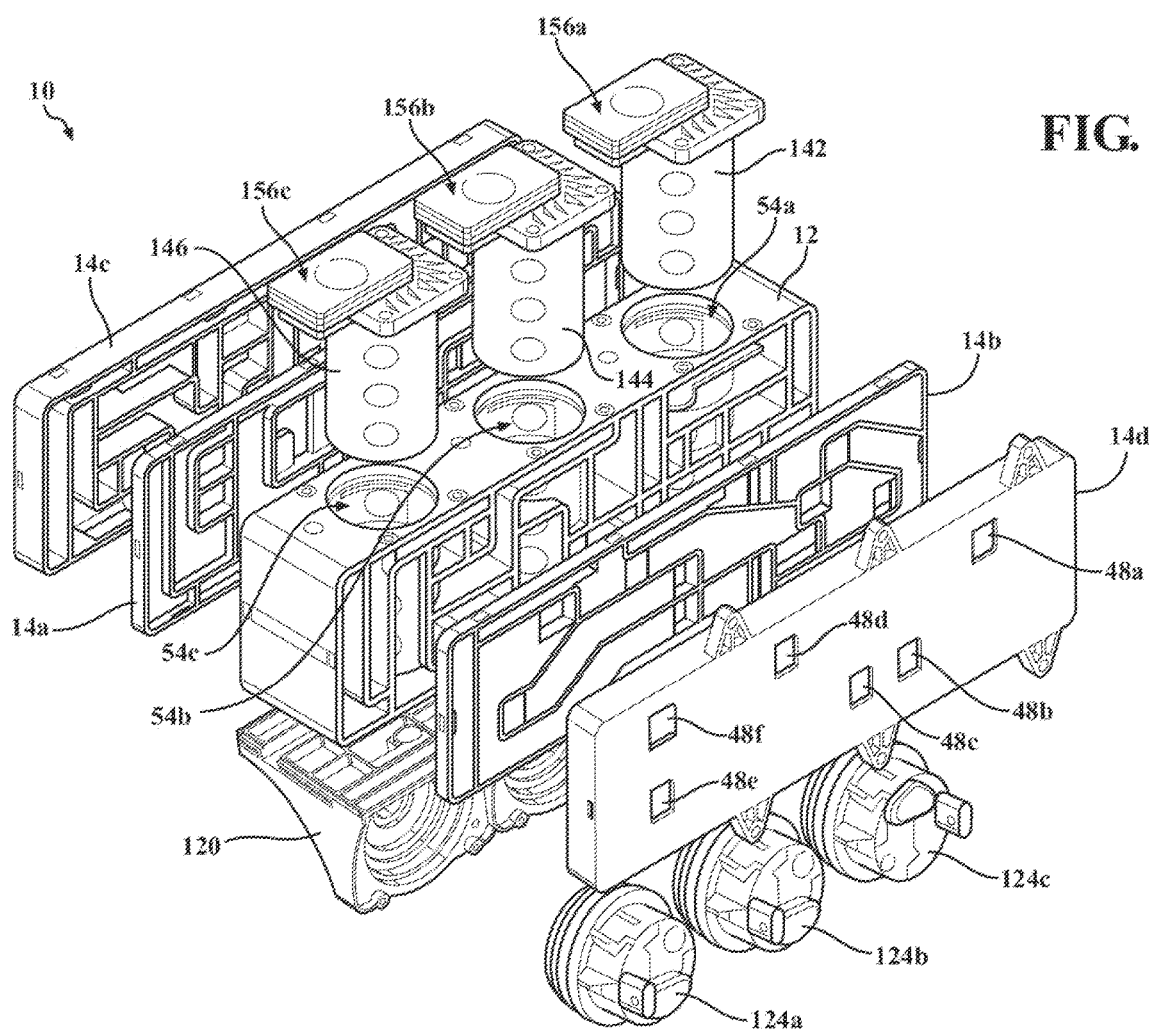
FIG. 3 is a first exploded view of a multi-port thermal module, according to embodiments of the present invention.
Figure 4:
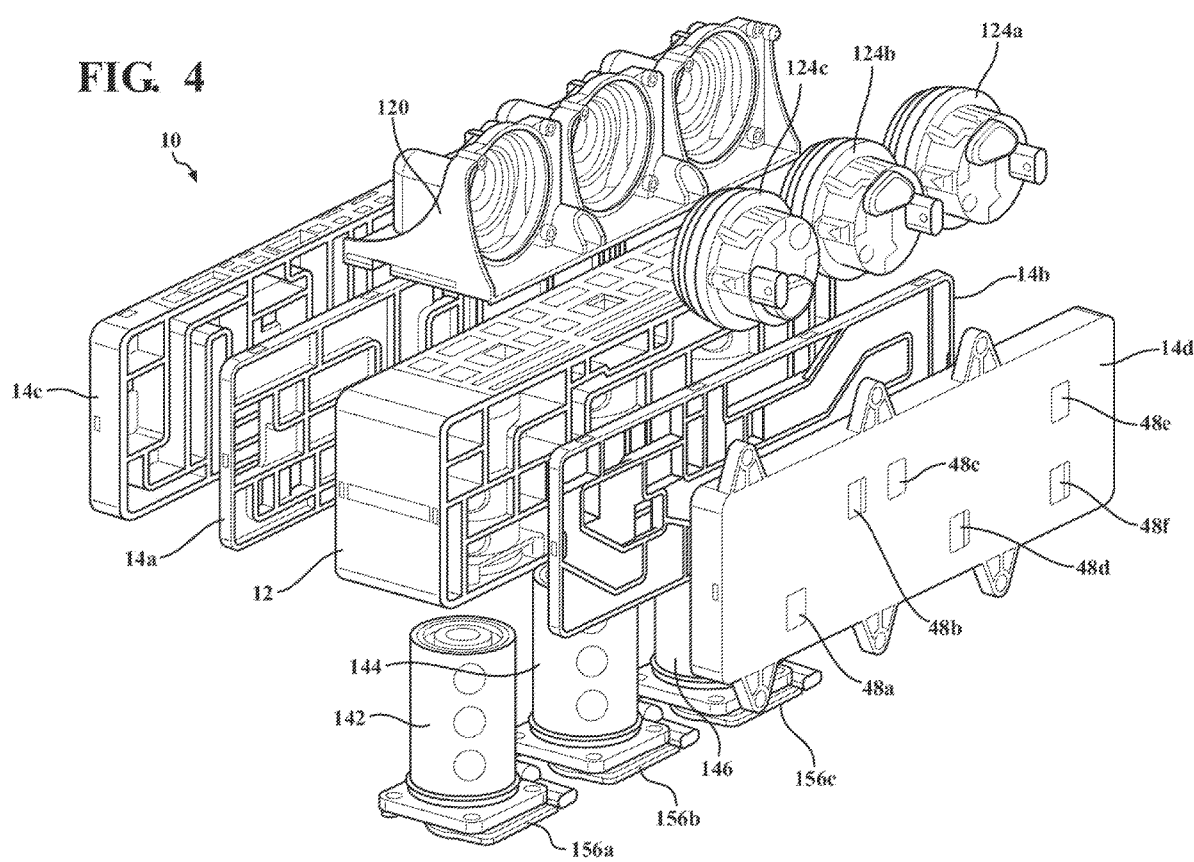
FIG. 4 is a second exploded view of a multi-port thermal module, according to embodiments of the present invention.
Figure 5:
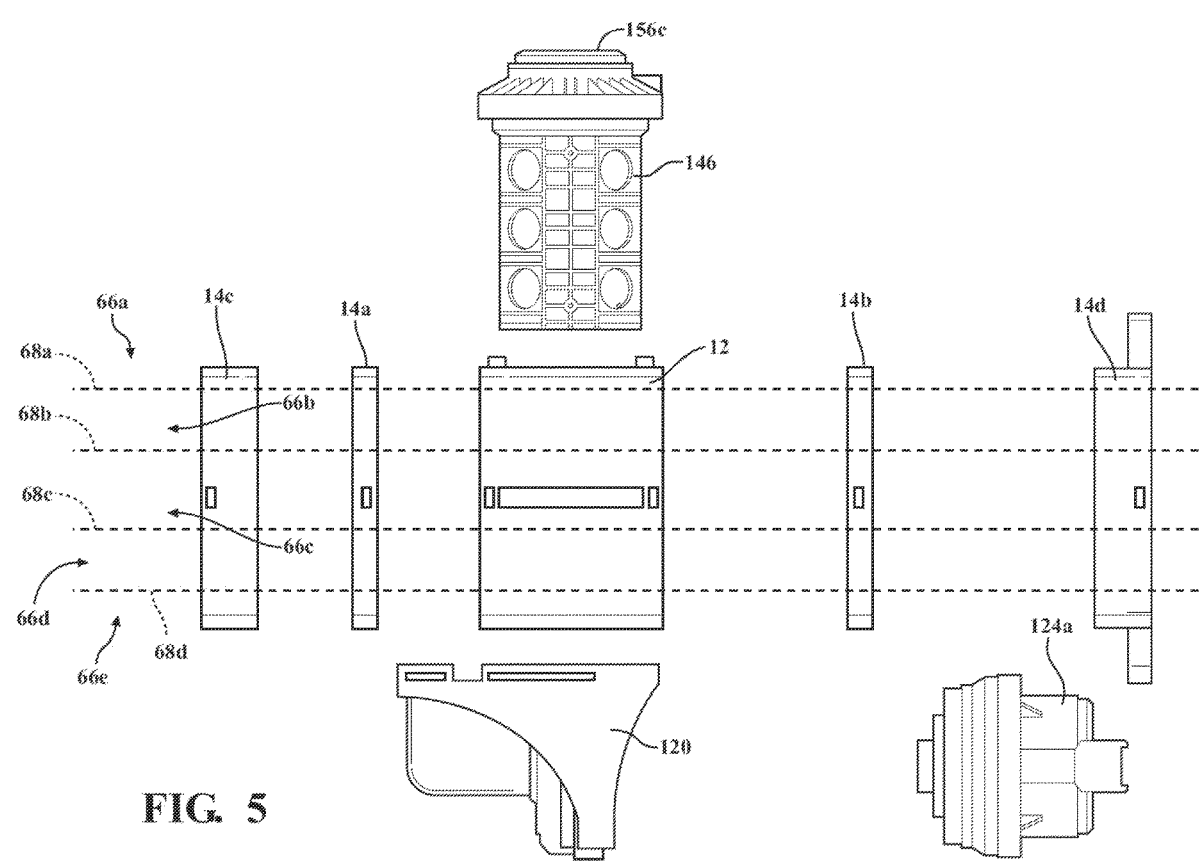
FIG. 5 is a third exploded view of a multi-port thermal module, according to embodiments of the present invention.
Figure 6:
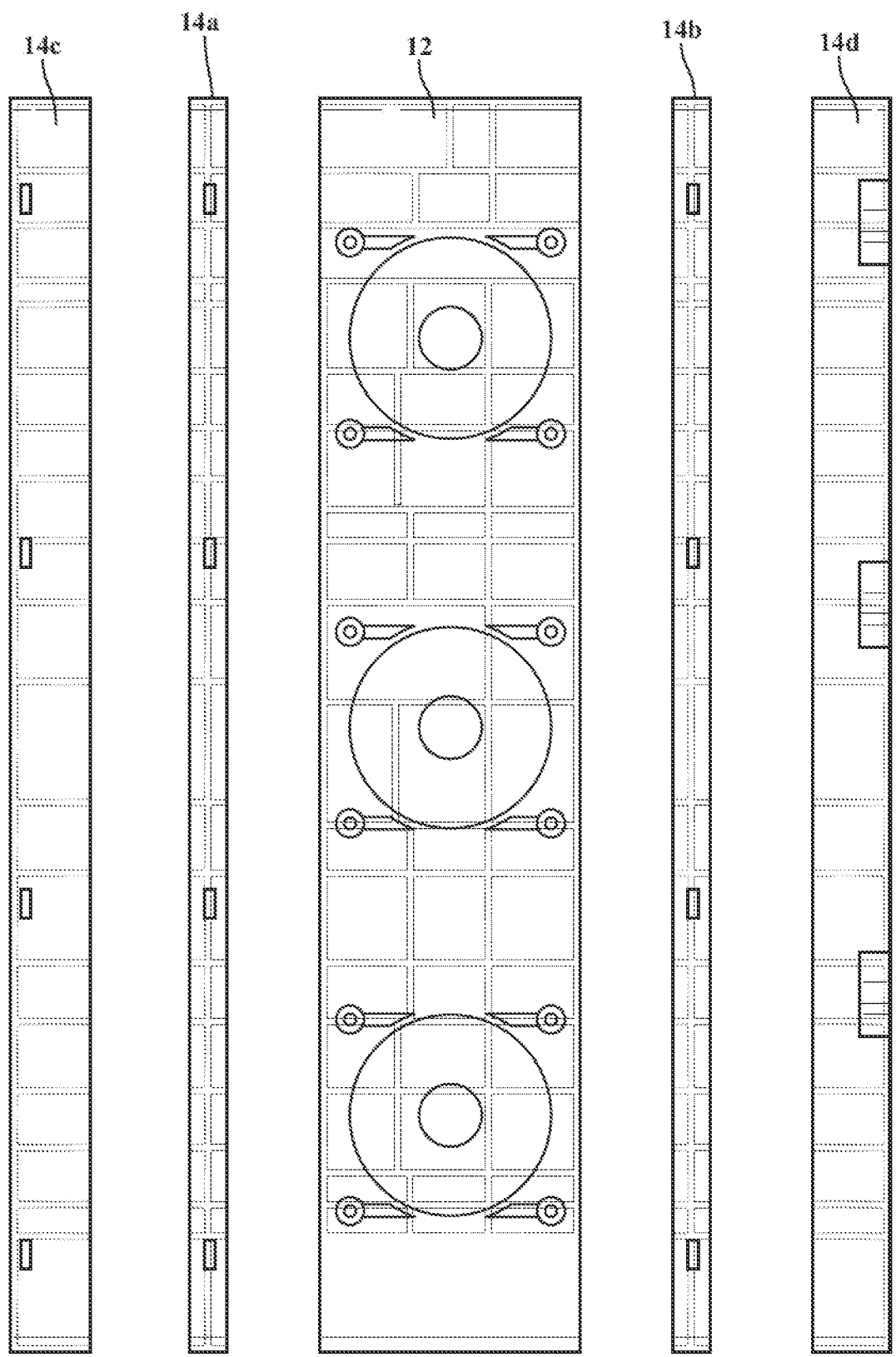
FIG. 6 is an exploded view of a central housing, a first inner housing portion, a second inner housing portion, a first outer housing portion, a second outer housing portion, which are part of a multi-port thermal module, according to embodiments of the present invention.
Figure 7A:
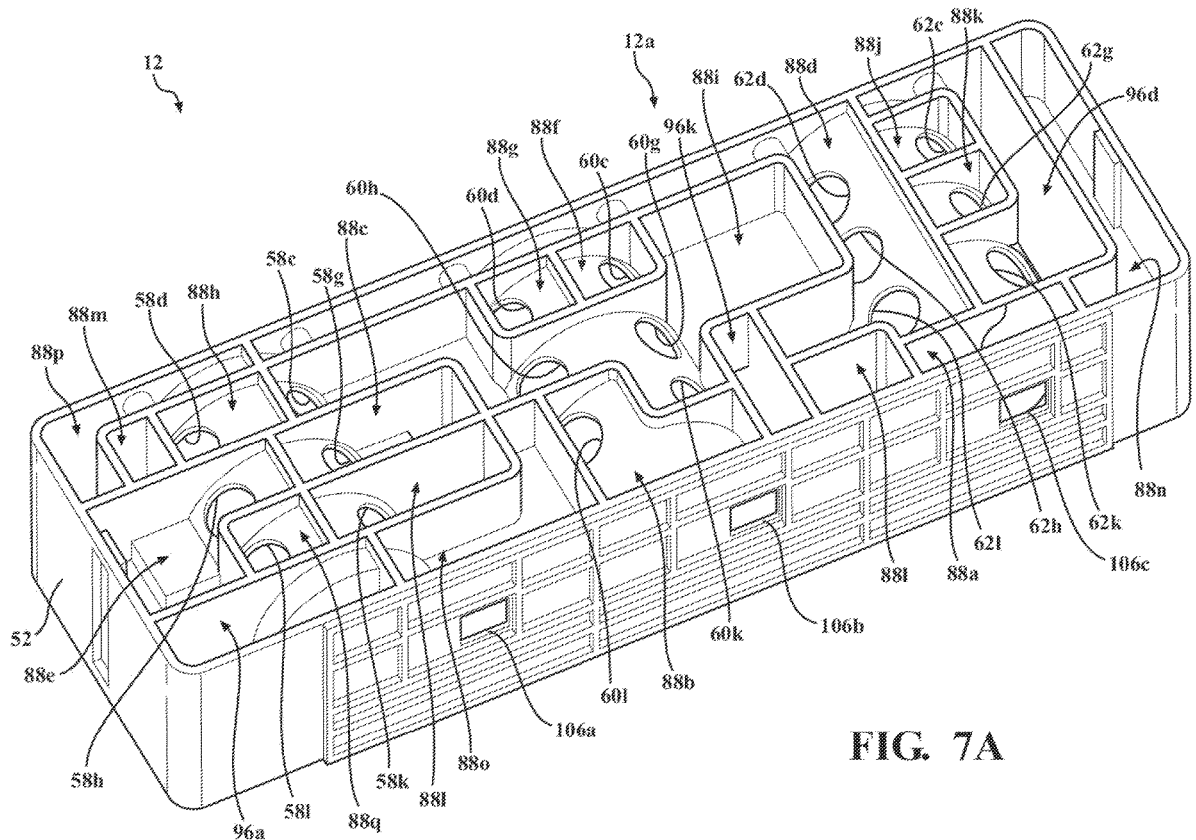
FIG. 7A is a first perspective view of a central housing which is part of a multi-port thermal module, according to embodiments of the present invention.
Figure 7B:
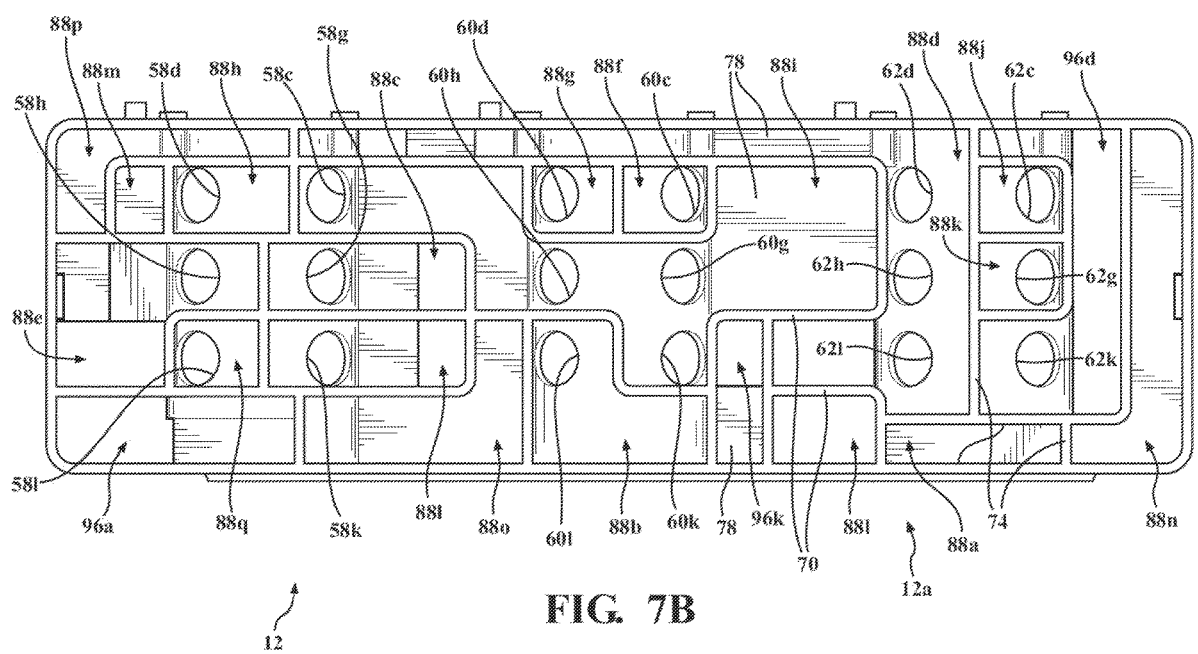
FIG. 7B is a first side view of a central housing which is part of a multi-port thermal module, according to embodiments of the present invention.
Figure 8A:
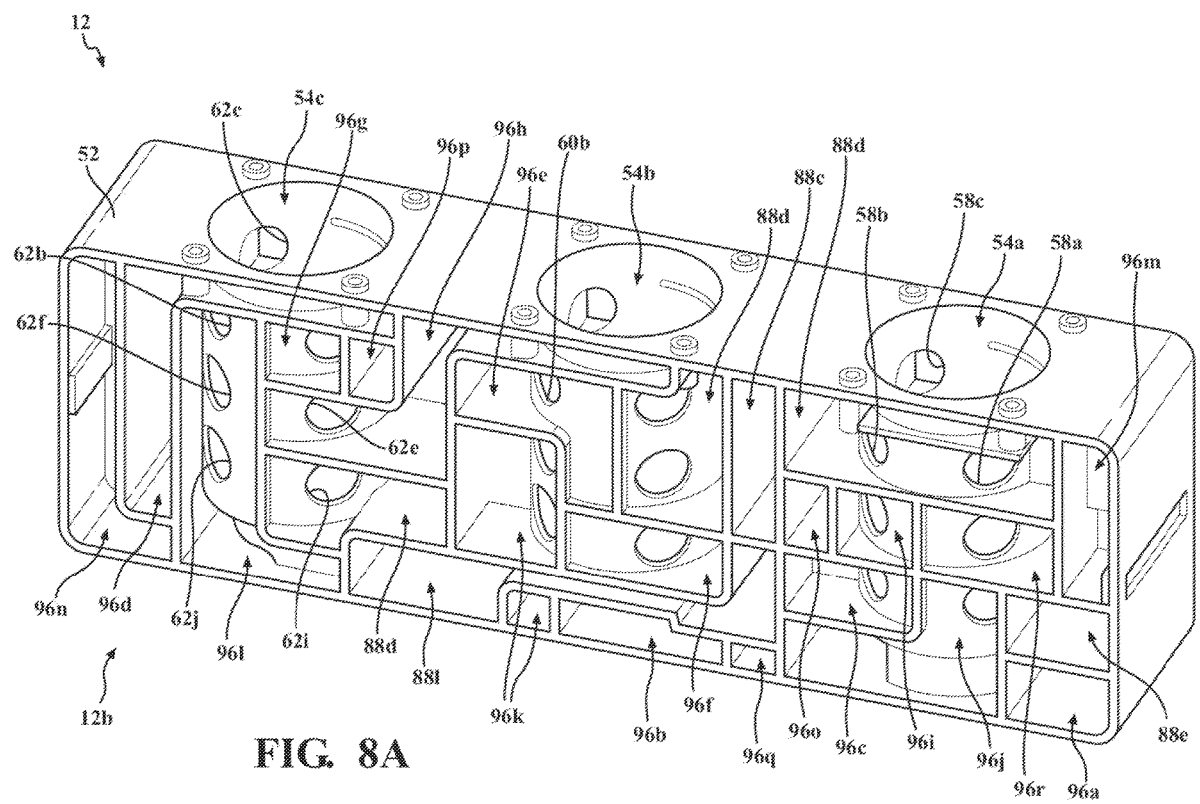
FIG. 8A is a second perspective view of a central housing which is part of a multi-port thermal module, according to embodiments of the present invention.
Figure 8B:
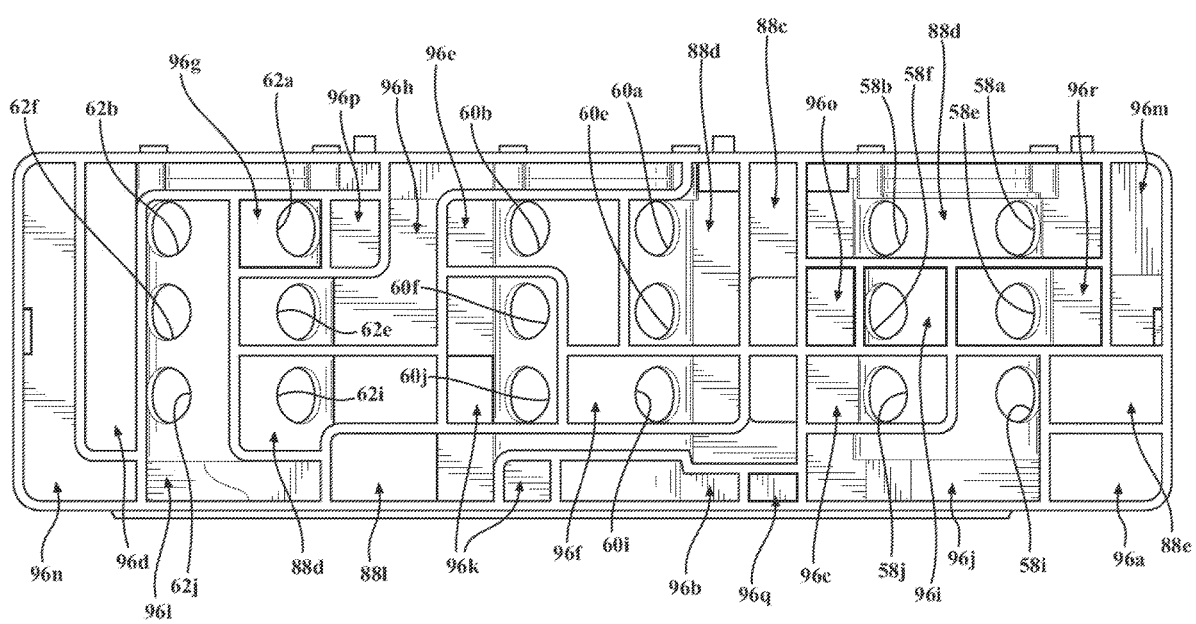
FIG. 8B is a second side view of a central housing which is part of a multi-port thermal module, according to embodiments of the present invention.

Additionally, with reference to FIGS. 1-2, the first outer housing portion 14c and the second outer housing portion 14d are direct interfaces to mating components, and may be modified to provide any desired connection, such as, but not limited to, tube style, manifold plate style with gasket, etc., with these mating components. Furthermore, the second outer housing portion 14a includes several mounting features 162a-162f which may be used to mount the multi-port thermal module 10 to any suitable component or mounting surface.

The number of housing portions may be increased or decreased such that the multi-port thermal module 10 may be adapted for different applications having various requirements with regard to the number of flow channels. Referring now to FIGS. 20-23B, another embodiment of the multi-port thermal module is shown, generally at 200.

The multi-port thermal module 200 includes a central housing 202, and connected to the central housing 202 is a first inner housing portion 204a, and a second inner housing portion 204b. The multi-port thermal module 200 also includes a first outer housing portion 206a and a second outer housing portion 206b. The first outer housing portion 206a is connected to the first inner housing portion 204a. The second outer housing portion 206b is connected to a first intermediate housing portion 208a, and there is a second intermediate housing portion 208b connected to the first intermediate housing portion 208a and the second inner housing portion 204b.

Each inner housing portion 204a,204b has apertures and inner flow channels which are in fluid communication with various flow cavities of the central housing 202 in a similar manner to the previous embodiment, and the flow cavities of the central housing 202 are in fluid communication with valves, or rotors, located in corresponding cylindrical cavities 210a,210b,210c of the central housing 202.

In a similar manner to the first embodiment, there are also multiple flow channels integrally formed as part of the inner housing portions 204a,204b, the outer housing portions 206a,206b, and the intermediate housing portions 208a, 208b.

More specifically, there is a first plurality of flow channels, where portions of the first inner housing 204a are part of a corresponding one of each of the first plurality of flow channels, and portions of the first outer housing 206a are part of a corresponding one of each of the first plurality of flow channels.

There is also a second plurality of flow channels, where portions of the second inner housing 204b are part of a corresponding one of each of the second plurality of flow channels, and portions of the second intermediate housing 208b are part of a corresponding one of each of the second plurality of flow channels.

There is also a third plurality of flow channels, where portions of the first intermediate housing 208a are part of a corresponding one of each of the third plurality of flow channels, and portions of the second intermediate housing 208b are part of a corresponding one of each of the third plurality of flow channels.

Additionally, there is also a fourth plurality of flow channels, where portions of the first intermediate housing 208a are part of a corresponding one of each of the fourth plurality of flow channels, and portions of the second outer housing 206b are part of a corresponding one of each of the fourth plurality of flow channels.

In the embodiment shown in FIGS. 21-24B, the two intermediate housing portions 208a,208b have been added, but it is within the scope of the invention that more or less intermediate housing portions may be used. Each intermediate housing portion 208a,208b includes various apertures and flow channels disposed between one or more walls extending away from a central wall. As a non-limiting example, the first intermediate housing portion 208a is shown in FIGS. 23A-23B. The first intermediate housing 208a has several apertures, several of which are referenced at 212, which are in fluid communication with corresponding flow channels, several of which are referenced at 214. The first intermediate housing 208a also has a central wall 216, and walls, several of which are referenced at 218, protruding away from the central wall 216.

In a similar manner to the previous embodiment, the rotors located in the cylindrical cavities 210a,210b,210c may be rotated to any one of several orientations to provide fluid communication between the flow cavities of the central housing 202.

It is also within the scope of the invention that intermediate housing portions may be added to the multi-port thermal module 10 to the first embodiment, and may be connected to, and my be disposed between, any of the the first inner housing portion 14a, the second inner housing portion 14b, the first outer housing portion 14c, the second outer housing portion 14d, and the central housing 12

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a multi-port thermal module, including:

a central housing;
a plurality of flow cavities integrally formed as part of the central housing;
a first inner housing portion connected to a first side of the central housing;
at least one inner flow channel integrally formed as part of the first inner housing portion and in fluid communication with at least one of the plurality of flow cavities;
at least one valve located in the central housing;
a first outer housing portion connected to the first inner housing portion;
at least one flow channel, a portion of the first inner housing portion being part of the at least one flow channel, and a portion of the first outer housing portion being part of the at least one flow channel such that the at least one flow channel is in fluid communication with the at least one inner flow channel;
wherein the at least one valve selectively directs fluid between two or more of the plurality of flow cavities.

2. The apparatus of claim 1, further comprising a cavity integrally formed as part of the central housing and in fluid communication with one or more of the plurality of flow cavities, wherein the at least one valve is disposed in the cavity.

3. The apparatus of claim 1, further comprising:
a pump housing connected to at least one of the central housing, the first inner housing portion, or the first outer housing portion;
at least one pump mounted to the pump housing;
at first pump housing channel integrally formed as part of the pump housing and in fluid communication with the at least one pump and at least one of the at least one channel flow channel or the at least one inner flow channel; and
a second pump housing channel integrally formed as part of the pump housing and in fluid communication with the at least one pump and the at least one valve;
wherein the at least one pump transfers fluid from either of the at least one flow channel or the at least one inner flow channel, through the first pump housing channel, through the second pump housing channel, and to the at least one valve.

4. The apparatus of claim 1, further comprising:
a second inner housing portion connected to the central housing;
at least one inner flow channel integrally formed as part of the second housing portion;
wherein the at least one inner flow channel integrally formed as part of the second housing portion is in fluid communication with at least one of the plurality of flow cavities.

5. The apparatus of claim 4, wherein the at least one inner flow channel integrally formed as part of the first inner housing portion and the at least one inner flow channel integrally formed as part of the second inner housing portion are in fluid communication with the same one of the plurality of flow cavities.

6. The apparatus of claim 4, further comprising:
a second outer housing portion connected to the second inner housing portion; and
at least one flow channel, a portion of the second inner housing portion being part of the at least one channel, and a portion of the second outer housing portion being part of the at least one channel;
wherein the at least one flow channel is in fluid communication with the at least one inner flow channel integrally formed as part of the second inner housing portion.

7. A multi-port thermal module, comprising:
a central housing;
a plurality of flow cavities integrally formed as part of the central housing;
a first inner housing portion connected to a first side of the central housing;
a first plurality of inner flow channels integrally formed as part of the first inner housing portion, each of the first plurality of inner flow channels in fluid communication with at least one of the plurality of flow cavities;
a first outer housing portion connected to the first inner housing portion;
a first plurality of flow channels, a portion of each of the first plurality of flow channels being integrally formed as part of the first inner housing, and another portion of each of the first plurality of flow channels being integrally formed as part of the first outer housing;
at least one valve disposed in the central housing;
at least one pump in fluid communication with and operable for transferring fluid from one of the first plurality of flow channels to the at least one valve; and
at least one actuator mounted to the central housing and connected to the at least one valve, and the at least one actuator changes the orientation of the at least one valve to direct fluid between two or more of the plurality of flow cavities, or direct fluid from the valve to one or more of the plurality of flow cavities;
wherein each of the first plurality of flow channels is in fluid communication with at least one of the first plurality of inner flow channels.

8. The multi-port thermal module of claim 7, further comprising:
the at least one valve further comprising a plurality of valves, each of the plurality of valves disposed in a corresponding cavity of the central housing; and
the at least one actuator further comprising a plurality of actuators mounted to the central housing and connected to a corresponding one of the plurality of valves;
wherein each of the plurality of actuators changes the orientation of a corresponding one of the plurality of valves to direct fluid between two or more of the plurality of flow cavities, or to direct fluid from a corresponding one of the plurality of valves to one or more of the plurality of flow cavities.

9. The multi-port thermal module of claim 8, further comprising:
a pump housing connected to the first outer housing and the central housing; and
the at least one pump further comprising a plurality of pumps mounted to the pump housing;
wherein each of the plurality of pumps is operable for transferring fluid from one of the first plurality of flow channels to a corresponding one of the plurality of valves.

10. The multi-port thermal module of claim 7, further comprising:
a second inner housing connected to a second side of the central housing; and
a second plurality of inner flow channels integrally formed as part of the second inner housing;
wherein each of the second plurality of inner flow channels is in fluid communication with at least one of the plurality of flow cavities.

11. The multi-port thermal module of claim 10, further comprising:
a second outer housing connected to the second inner housing; and
a second plurality of flow channels, each of the second plurality of flow channels is in fluid communication with at least one of the second plurality of inner flow channels;
wherein a portion of each of the second plurality of flow channels is integrally formed as part of the second inner housing, and another portion of each of the second plurality of flow channels is integrally formed as part of the second outer housing.

12. The multi-port thermal module of claim 10, wherein at least one of the plurality of flow cavities is in fluid communication with one of the first plurality of inner flow channels and one of the second plurality of inner flow channels.

13. The multi-port thermal module of claim 7, wherein one or more of the plurality of flow cavities extends through the central housing.

14. The multi-port thermal module of claim 7, wherein one of the first plurality of inner flow channels is in fluid communication with at least two of the plurality of flow cavities integrally formed as part of the central housing.

* * * * *